United States Patent
Inui

(10) Patent No.: US 10,025,542 B2
(45) Date of Patent: Jul. 17, 2018

(54) BOOKBINDING SYSTEM, PRINTING APPARATUS, METHOD OF CONTROLLING THE SAME AND STORAGE MEDIUM

(71) Applicant: CANON KABUSHIKI KAISHA, Tokyo (JP)

(72) Inventor: Masanobu Inui, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/995,405

(22) Filed: Jan. 14, 2016

(65) Prior Publication Data

US 2016/0224295 A1    Aug. 4, 2016

(30) Foreign Application Priority Data

Feb. 4, 2015   (JP) ................... 2015-020613

(51) Int. Cl.
*G06F 3/12* (2006.01)
*H04N 1/00* (2006.01)

(52) U.S. Cl.
CPC .......... *G06F 3/1252* (2013.01); *G06F 3/1205* (2013.01); *G06F 3/1219* (2013.01); *G06F 3/1258* (2013.01); *G06F 3/1285* (2013.01); *G06F 3/1286* (2013.01)

(58) Field of Classification Search
None
See application file for complete search history.

(56) References Cited

U.S. PATENT DOCUMENTS

| | | | |
|---|---|---|---|
| 7,027,180 B2 | 4/2006 | Nishikawa et al. | |
| 7,957,024 B2 | 6/2011 | Tokashiki | |
| 7,970,338 B2 | 6/2011 | Tokashiki | |
| 8,085,429 B2 | 12/2011 | Nishikawa et al. | |
| 8,285,429 B2 | 10/2012 | Kumar | |
| 8,325,378 B2 | 12/2012 | Nishikawa et al. | |
| 9,291,978 B2 | 3/2016 | Mizuguchi | |
| 2002/0059338 A1 | 5/2002 | Nishikawa et al. | |
| 2006/0061793 A1 | 3/2006 | Nishikawa et al. | |
| 2011/0051162 A1* | 3/2011 | Okada | G06K 15/1884 358/1.12 |

(Continued)

FOREIGN PATENT DOCUMENTS

| | | |
|---|---|---|
| CN | 104219410 A | 12/2014 |
| JP | 2002-149637 A | 5/2002 |

(Continued)

OTHER PUBLICATIONS

May 2, 2017 Chinese Official Action in Chinese Patent Appln. No. 201610070131.6.

*Primary Examiner* — Helen Zong

(74) *Attorney, Agent, or Firm* — Fitzpatrick, Cella, Harper & Scinto

(57) ABSTRACT

It is determined whether or not an inputted job input includes a setting for bookbinding including an opening orientation of a bookbinding product; and upon determining that the job includes the setting, image data of the job is printed in a layout according to the setting for the bookbinding if the opening orientation of the bookbinding product in the setting is left-open, and the image data of the job is printed in the layout according to the setting for the bookbinding after causing the image data to rotate 180 degrees if the opening orientation of the bookbinding product in the setting is right-open.

6 Claims, 18 Drawing Sheets

(56) References Cited

U.S. PATENT DOCUMENTS

| | | | | |
|---|---|---|---|---|
| 2012/0002232 A1* | 1/2012 | Inui | ............... | H04N 1/00 |
| | | | | 358/1.13 |
| 2012/0070251 A1 | 3/2012 | Nishikawa et al. | | |
| 2013/0175753 A1* | 7/2013 | Miyake | ............... | B65H 37/04 |
| | | | | 270/58.08 |
| 2013/0222857 A1* | 8/2013 | Nobushima | ............... | G06K 15/1848 |
| | | | | 358/1.18 |
| 2015/0262049 A1* | 9/2015 | Kawano | ............... | B41J 11/0065 |
| | | | | 412/16 |
| 2016/0156788 A1* | 6/2016 | Mizuguchi | ............... | G03G 15/6585 |
| | | | | 358/1.15 |

FOREIGN PATENT DOCUMENTS

| | | |
|---|---|---|
| JP | 2010-119063 A | 5/2010 |
| JP | 2014-081829 A | 5/2014 |
| KR | 10-2007-0078815 A | 8/2007 |

* cited by examiner

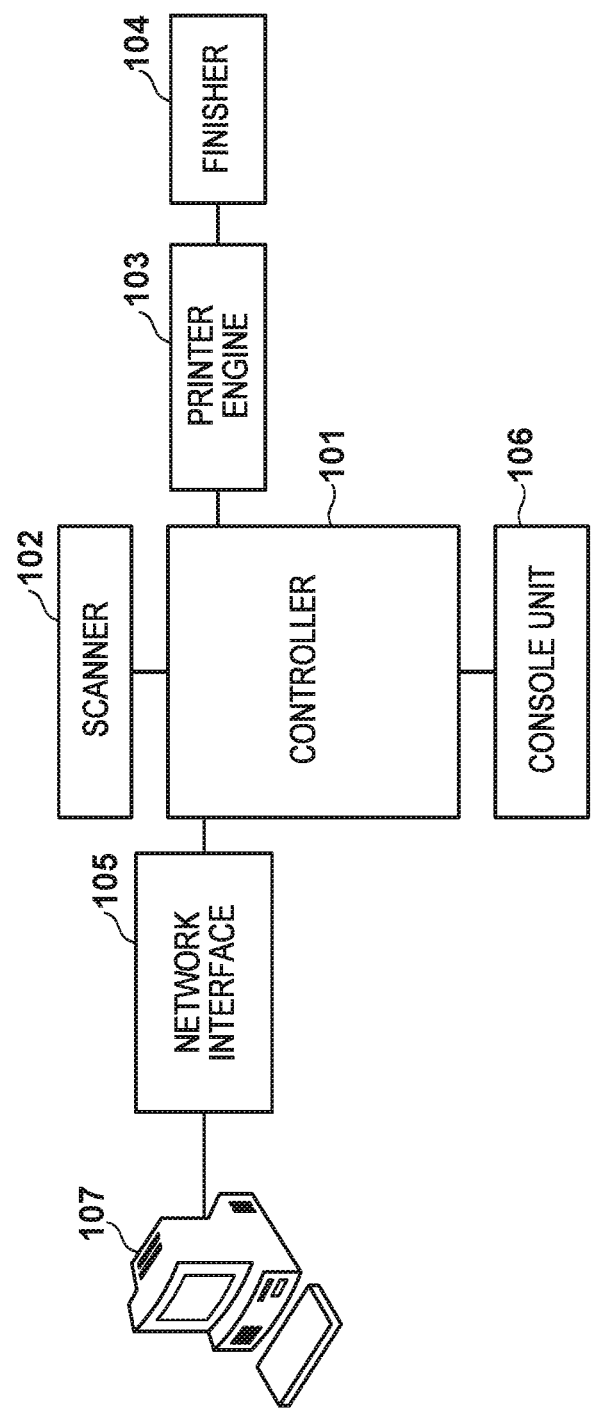

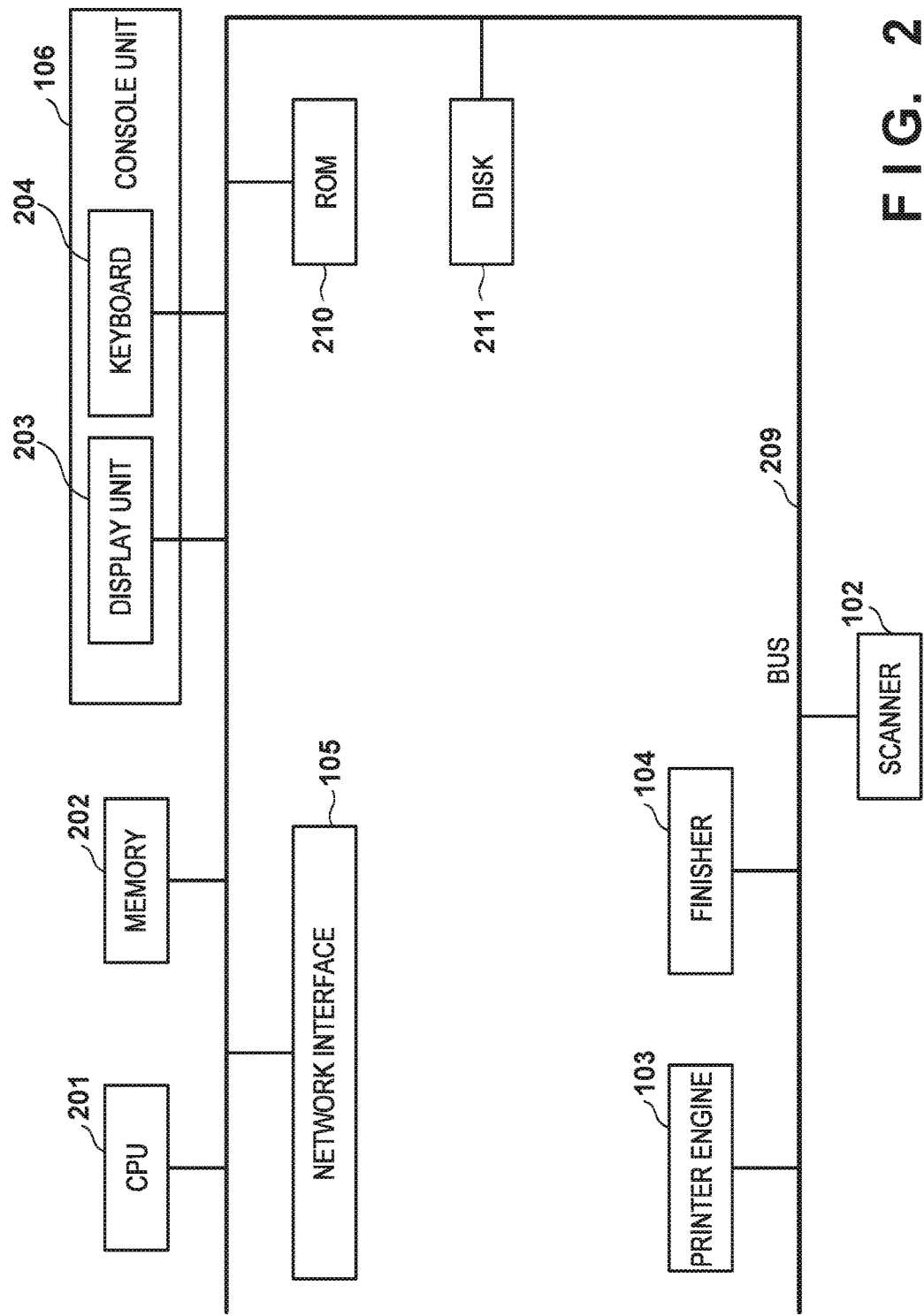

LEFT-OPEN

RIGHT-OPEN

BOOKBINDING SYSTEM, PRINTING APPARATUS, METHOD OF CONTROLLING THE SAME AND STORAGE MEDIUM

BACKGROUND OF THE INVENTION

Field of the Invention

The present invention relates to a bookbinding system, a printing apparatus, a method of controlling the same, and a storage medium.

Description of the Related Art

With conventional techniques, it is possible to easily output multiple copies of a resulting product that is bound by a saddle stitch, a saddle fold or the like, using an MFP (multi-function peripheral) comprising a saddle finisher. Also, print processing for bookbinding by which it is possible to obtain a cover for bookbinding that a user desires by selection of whether or not to print on a front or a back of a front cover, and on a front or a back of a back cover is known (refer to for example, Japanese Patent Laid-Open No. 2002-149637).

In conventional techniques, it is possible to generate a large amount of resulting products by an extended saddle finisher function. Saddle stitching book-binds by folding a printed sheet in half. Accordingly, for each sheet, being printed in a 2-in-1, for example, often occurs, and a sheet on which an image is formed on only one side often occurs. In such a case, depending on the layout of the images of these sheets, there are cases in which it appears as though blank sheets continue in a state in which printed sheets are folded in half. In such a case, there is a problem in that it is difficult to determine whether or not printing to the sheets is being executed normally. For example, due to a bookbinding print being started in a state in which a user forgot cover print settings, there will be a delay in the user noticing that the user forgot cover print settings even if blank sheets continue, and unnecessary printed material will be generated in a large amount.

SUMMARY OF THE INVENTION

An aspect of the present invention is to eliminate the above-mentioned problems with conventional technology.

A feature of the present invention is to provide a technique by which a user can quickly determine an abnormality in bookbinding products when the bookbinding products are discharged.

According to a first aspect of the present invention, there is provided a printing apparatus, comprising: an input unit configured to input a job; a first determination unit configured to determine whether or not the job input by the input unit includes a setting for bookbinding including an opening orientation of a bookbinding product; and a control unit configured to control, upon the first determination unit determining that the job includes the setting, to print image data of the job in a layout according to the setting for the bookbinding if the opening orientation of the bookbinding product in the setting is left-open, and to print the image data of the job in the layout according to the setting for the bookbinding after causing the image data to rotate 180 degrees if the opening orientation of the bookbinding product in the setting is right-open.

According to a second aspect of the present invention, there is provided a bookbinding system comprising an image forming apparatus and a post-processing apparatus, wherein the image forming apparatus comprises: a setting unit configured to perform setting for a bookbinding with respect to a job; a first determination unit configured to determine whether or not the setting for the bookbinding includes a setting for bookbinding including an opening orientation of a bookbinding product; and a control unit configured to control, upon the first determination unit determining that the setting includes the setting for the bookbinding, to print image data of the job in a layout according to the setting for the bookbinding if the opening orientation of the bookbinding product in the setting is left-open, and to print the image data of the job in the layout according to the setting for the bookbinding after causing the image data to rotate 180 degrees if the opening orientation of the bookbinding product in the setting is right-open, and wherein the post-processing apparatus comprises a bookbinding unit configured to receive sheets on which images are respectively printed by the image forming unit, and to book-bind the sheets in accordance with the setting for the bookbinding.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view for explaining a configuration of an MFP which is one example of a printing apparatus according to a first embodiment of the present invention.

FIG. 2 is a block diagram for describing a hardware configuration of a controller according to the first embodiment.

DESCRIPTION OF THE EMBODIMENTS

Figure 3A:
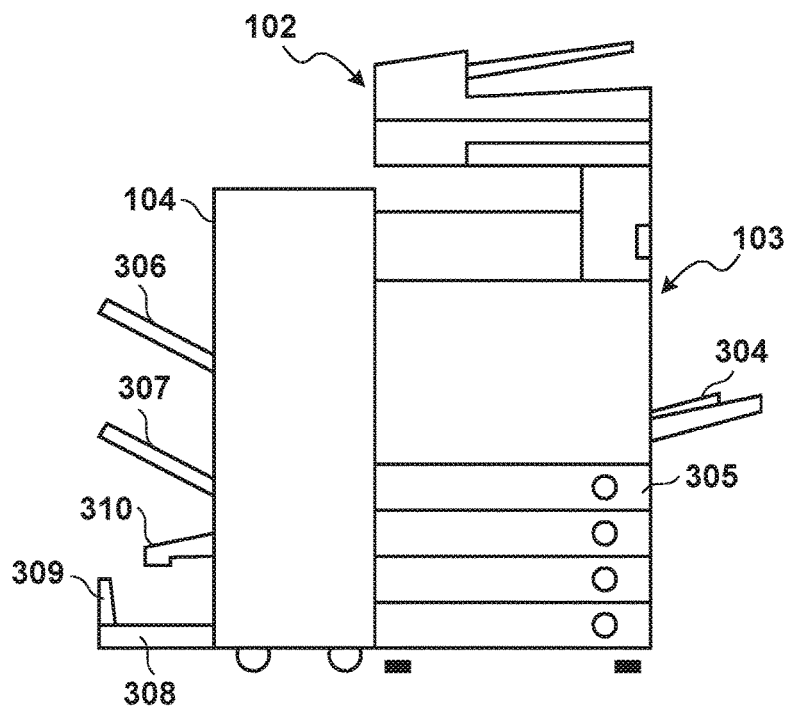
FIG. 3A depicts an outline view of the MFP according to the first embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 depicts a view for explaining a configuration of a bookbinding system including a multi-function peripheral (MFP) which is one example of a printing apparatus according to a first embodiment of the present invention.

In FIG. 1, a controller (a control unit) 101 for controlling the MFP has a hardware configuration as shown in FIG. 2, and controls an operation of this MFP. A scanner 102 is controlled by the controller 101, reads an original and outputs image data corresponding to an image of the original. A printer engine 103 is controlled by the controller 101, and prints an image on a recording medium (e.g. a sheet) in accordance with image data received from the controller 101. A finisher 104 is connected to the printer engine 103. The finisher 104 collects a plurality of sheets discharged from the printer engine 103, and can execute post-processing for example stapling, saddle stitch bookbinding processing, or the like. The finisher 104 is also controlled by the controller 101. A network interface 105 provides bi-directional communication with a network to the controller 101, and the MFP is connected to a personal computer 107 through the network. A console unit 106 is a user interface of this MFP that comprises a display unit and a keyboard as illustrated in FIG. 2, displays images or a message or the like on the display unit in accordance with information from the controller 101, and transmits an instruction from the user to the controller 101. Also, functions of this MFP can be used via an interface such as the network.

FIG. 2 is a block diagram for describing a hardware configuration of the controller 101 according to the first embodiment. Here, the same reference numerals are shown for portions common with FIG. 1.

In the controller 101, a CPU 201 is connected, through a bus 209, to a memory 202, a display unit 203 and a keyboard 204 of the console unit 106, the network interface 105, a ROM 210, and a disk 211. Various programs executed by the CPU 201 and data are stored in the disk 211 (a storage medium), which is a hard disk, a floppy disk, or the like, and are read to the memory 202 and executed by the CPU 201 as necessary. This disk 211 may be detachably mountable to the MFP or may be incorporated in the MFP. Also, configuration may be taken such that this program is downloaded from another MFP, a PC, or the like through the network and stored in the disk 211. Also, for memory, there is a non-volatile memory such as a DRAM and a volatile memory such as an SRAM, but the memory 202 may comprise both functions, or may take a configuration in which the memory 202 handles a volatile memory function, and the disk 211 handles a non-volatile memory function. Also, removable memory media may be used.

The CPU 201 controls display of an image, a message, or the like to the display unit 203, and obtains information inputted by the user operating the keyboard 204. Note, in a case where the display unit 203 comprises a touch panel function, the information inputted through the touch panel is also transferred to the CPU 201. The information inputted in this way is transferred and stored in either the memory 202 or the disk 211, and is used for various processes.

Also, the network interface 105 is connected to the bus 209, and the CPU 201 is capable of performing communication through the network interface 105 with the network. Furthermore, the printer engine 103, the finisher 104, and the scanner 102 are connected to the bus 209. By the CPU 201 performing reading/writing of the data through the bus 209 to the printer engine 103 or the scanner 102, it is possible to control these engines, as well as obtain statuses thereof.

Image data inputted from the scanner 102 or received through the network interface 105 can be saved to the disk 211 or the memory 202 of the controller 101. Also, by storing image data in a removable memory in advance and connecting the removable memory to the controller 101, it is possible to incorporate the image data stored in the removable memory. The image data stored in the disk 211 can be moved or copied to the memory 202, and various layout processes can be applied to the image data in the memory 202 by the content instructed from the console unit 106. Note, a configuration may be taken so that the printer engine 103, the finisher 104 and the scanner 102 are not within the MFP but exist as peripheral devices that are respectively separate in the network and are controlled by the controller 101 of the MFP.

FIG. 3A depicts an outline view of the MFP according to the first embodiment.

The scanner 102, which is an image input device, obtains electrical image data from an original placed on the scanner by illuminating an image on the original and scanning the image by a CCD line sensor. Also, from the image data obtained in this way, it is possible to perform a color determination or a size determination for the original.

The printer engine 103, which is an image output device, prints an image on a sheet based on the image data received from the controller 101. Also, it is possible to discharge a printed sheet to the finisher 104 in accordance with an instruction from the controller 101 and cause post-processing such as stapling or bookbinding to be performed. An activation or a stop of a print operation is performed in accordance with an instruction from the CPU 201 in the controller 101. The user sets a sheet used for printing to a manual feed tray 304 or a paper feed cassette 305.

Sheet discharge trays 306 and 307 of the finisher 104 stack and store sheets printed and discharged by the printer engine 103. A saddle tray 308 stacks and stores a resulting product (book) discharged after saddle binding. A stopper 309 prevents a resulting products, which has been saddle-bound and is stacked on the saddle tray 308, from dropping. Note, the stopper 309 can be in a standing state for preventing resulting products from dropping as shown in the figure, and a collapsed state in which dropping is not prevented. In a case where the saddle-bound resulting products stacked on the saddle tray 308 reach capacity on the saddle tray 308, a tray sensor 310 is pressed up by the resulting products and state in which the saddle tray 308 is full is detected.

Figure 3B:
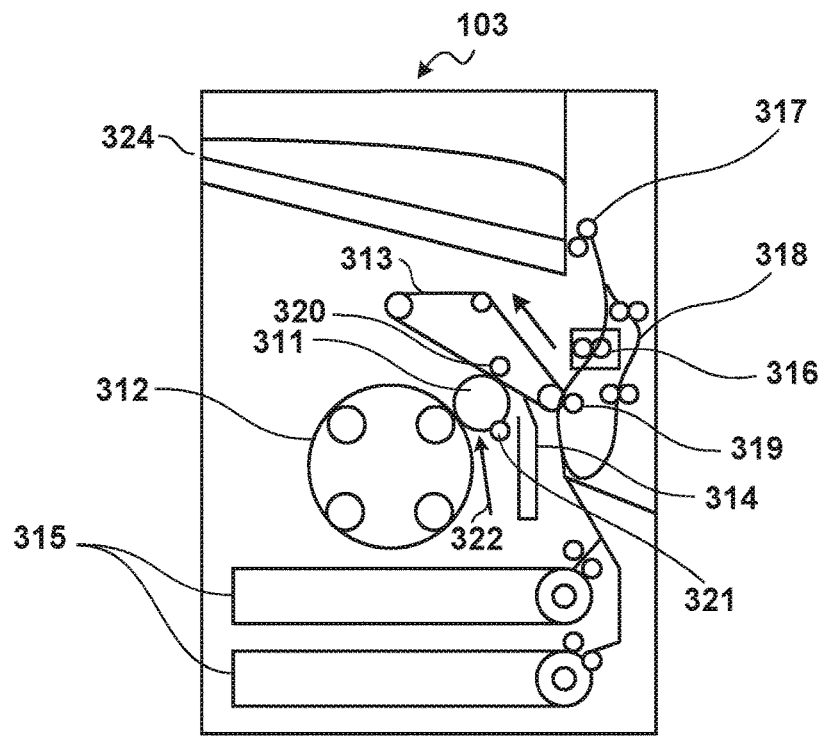
FIG. 3B depicts a cross-sectional view for explaining a configuration of a printer engine of the MFP according to the first embodiment.

FIG. 3B depicts a cross-sectional view for explaining a configuration of the printer engine 103 of the MFP according to the first embodiment. Here, an example of a full color printer engine of an electrophotographic method is shown.

Processing for charging to particular polar potential is performed for a photosensitive drum 311 by a primary charger 321, and a position illustrated by an arrow symbol 322 is exposed with a laser light by an exposure unit (not shown). In this way, when an electrostatic latent image corresponding to a first color component is formed, the electrostatic latent image is developed using one developer corresponding to the formed color component image among four developers of a developer 312. An intermediate transfer belt 313 is driven in a direction shown by an arrow symbol. A toner image of the first color component formed on the photosensitive drum 311 is transferred to the intermediate transfer belt 313 by an electric field formed by a primary transfer roller 320 in the process of passing through a junction part between the photosensitive drum 311 and the intermediate transfer belt 313. In this way, after the toner image of the first color component is transferred to the intermediate transfer belt 313, the surface of the photosensitive drum 311 is cleaned by a cleaning unit 314. By repeating this process for four colors, the images with the four colors (Y, M, C, K) are overlapped by the intermediate transfer belt 313 to form a color image. Note, in a case of forming a single color image, the transferring process is performed only once. In this way, the toner image transferred to the intermediate transfer belt 313 is transferred to a sheet fed from a cassette 315 by a secondary transfer roller 319. Thus, the toner image is fixed to the surface of the sheet to which the toner image is transferred by being heated and pressurized by a fixing unit 316. In this way, the sheet to which the image is fixed passes through a discharge roller 317, is conveyed to a discharge orifice 324, and is discharged from the MFP. Also, in a case of performing double-sided printing, a sheet to which an image is fixed on a first surface thereof is reversed by a reversing path 318, and an image is formed on a second surface of the sheet as described previously.

Figure 4A:
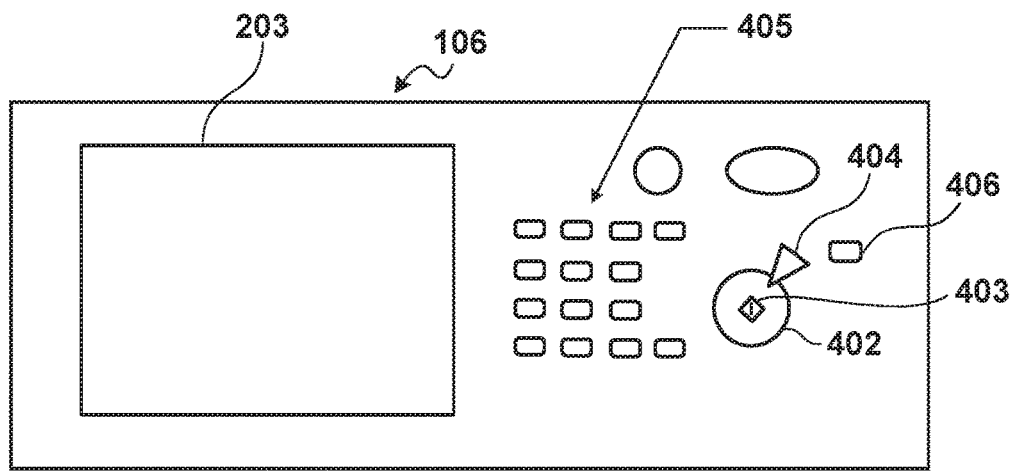
FIG. 4A depicts an outline view of a console unit the MFP according to the first embodiment.

FIG. 4A depicts an outline view of the console unit 106 of the MFP according to the first embodiment.

A touch panel sheet is affixed on a screen of the display unit 203, a menu screen or an operation screen and softkeys are displayed, and when a displayed key is pressed, position information is transmitted to the CPU 201. A start key 402 is used in a case where an operation for reading of an original is started. A dual color LED 403 whose colors are green and red is arranged on the central portion of the start key 402, and by the color of an LED 403 whether or not the start key 402 can be used is indicated. A stop key 404 works to stop an operating operation. A numeric keypad 405 comprises a group of buttons for numerals, symbols, and characters, and is used for instructing a setting of a number of copies, a switching of a screen displayed on the display unit 203, or the like. A user mode key 406 is pressed in a case of performing a device setting. Note, the keyboard 204 in FIG. 2 includes these keys 402, and 404 to 406.

Figure 4B:
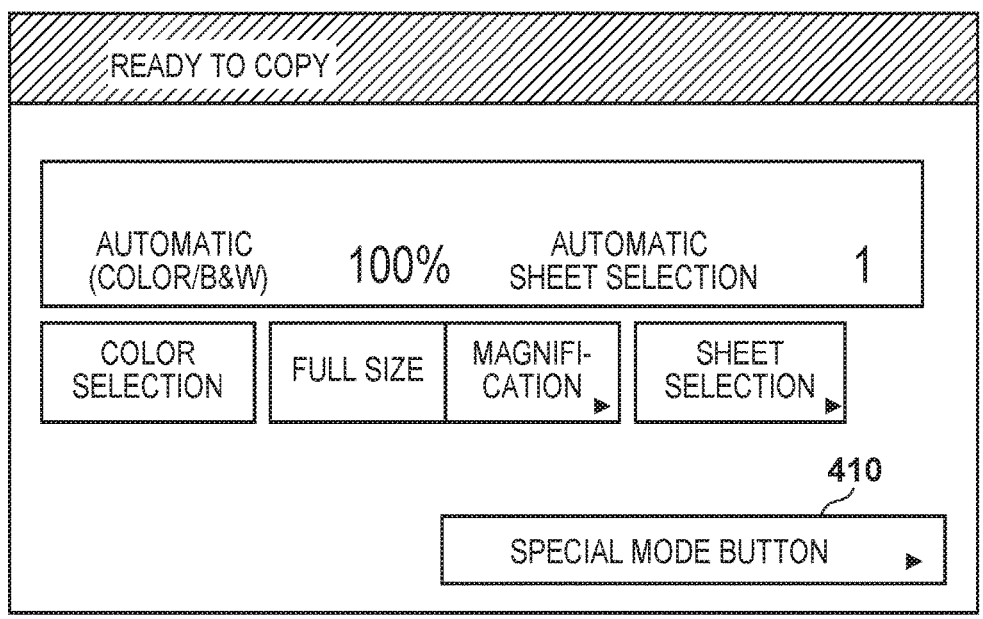
FIG. 4B depicts a view for illustrating an example of an initial screen for copying displayed on a display unit of the console unit of the MFP according to the first embodiment.

FIG. 4B depicts a view for illustrating an example of an initial screen for copying displayed on the display unit 203 of the console unit 106 of the MFP according to the first embodiment.

Through this screen a user can select a sheet cassette used for a copy processing, and perform a setting such as of a scaling factor of a copy, a color copy or a monochrome copy, and the like.

Figure 5:
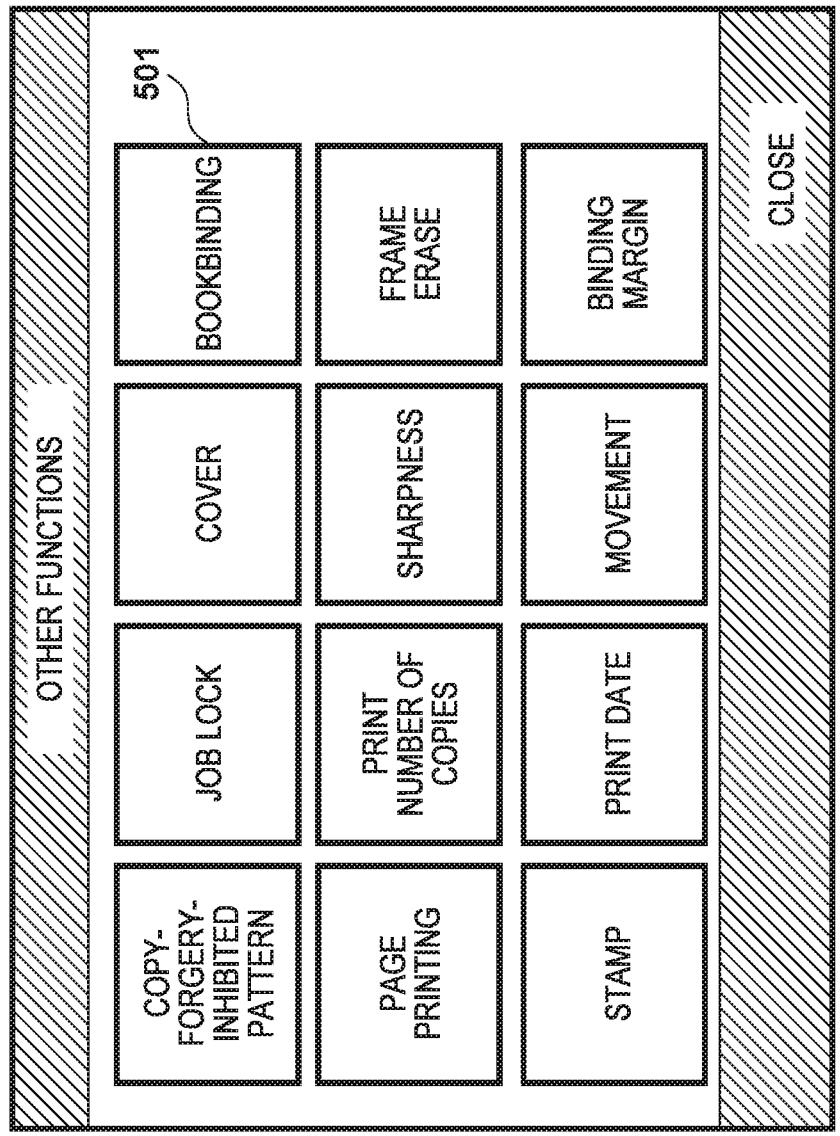
FIG. 5 depicts a view for illustrating an example of function setting screen displayed when a user makes an instruction on a special mode button in the initial screen for copying in FIG. 4B.

FIG. 5 depicts a view for illustrating an example of a function setting screen displayed when a user makes an instruction on a special mode button 410 in the initial screen for copying in FIG. 4B.

This function setting screen includes a function button group for instructing various functions, and it is possible for the user to perform more detailed function setting by selecting a function to be set from the function button group.

Figure 6:
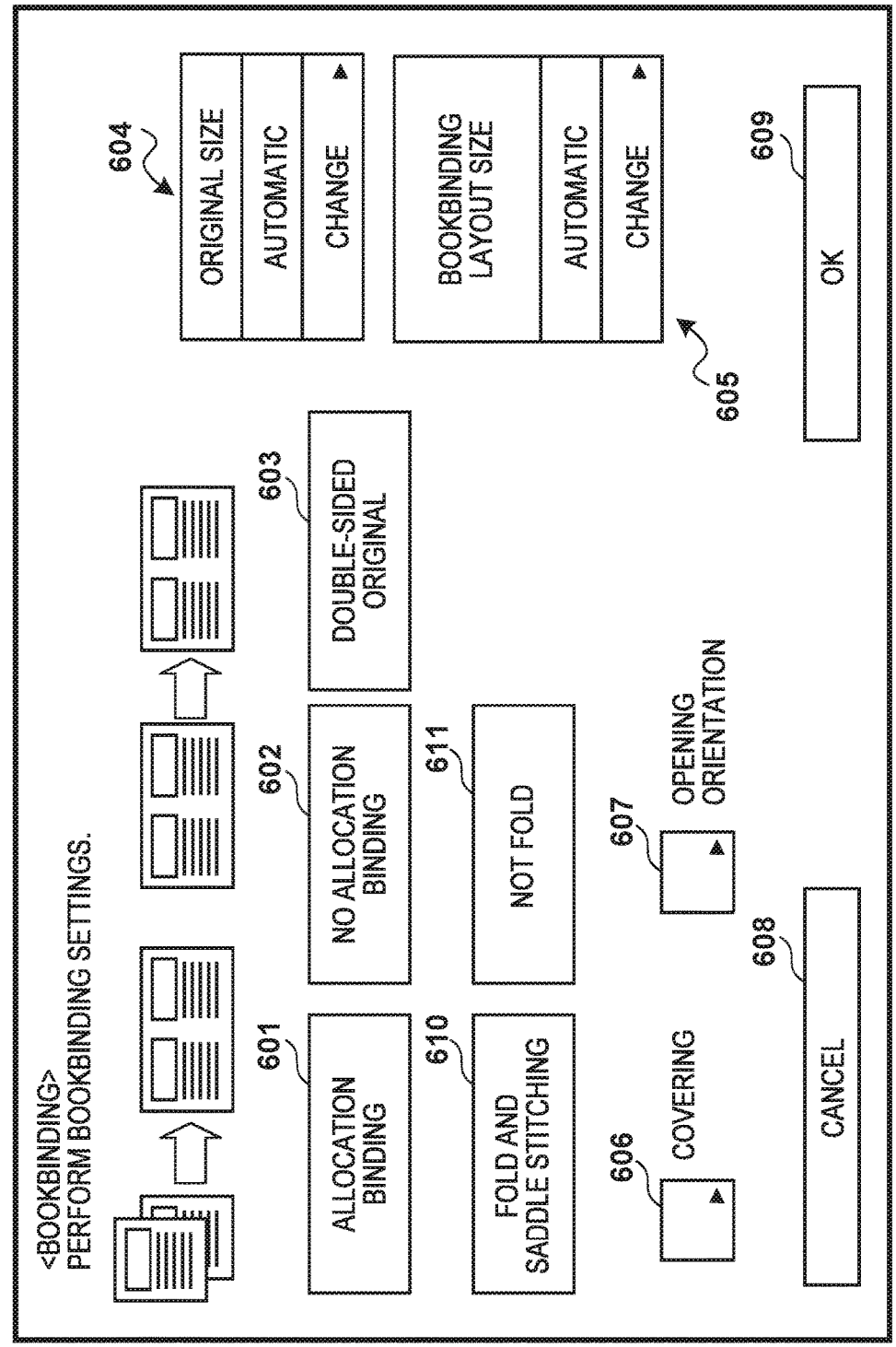
FIG. 6 depicts a view for illustrating an example of the binding copy setting screen displayed when the user presses a bookbinding button on the screen in FIG. 5.

FIG. 6 is a view for illustrating an example of a binding copy setting screen displayed when the user presses a bookbinding button 501 on the screen in FIG. 5.

An "allocation binding" button 601 is a button pressed in a case where the user wants to perform an allocation binding. In a case where the user does not execute the allocation binding, a "no allocation binding" button 602 is pressed. The "allocation binding" button 601 and the "no allocation binding" button 602 are selected mutually exclusively. The screen example in FIG. 6 illustrates a state where the "allocation binding" button 601 is selected.

A "double-sided original" button 603 is pressed in a case where both sides of an original are read. An original setting button 604 is pressed when changing the size of the original. A paper setting button 605 is pressed when changing a sheet size of output in copying.

A "fold and saddle stitching" button 610 is pressed in a case where a user wants to perform a saddle stitch (saddle stitching). A "not fold" button 611 is pressed in a case where the user does not wish to perform saddle stitching. The example of a screen in FIG. 6 illustrates a state where the saddle stitching is selected.

A "covering" button 606 is pressed in a case where a user desires to add a cover to the bookbinding. An "opening orientation" button 607 is pressed in a case where the user instructs opening orientation (left-open or right-open) for a time of bookbinding outputting. A "cancel" button 608 is pressed in a case where a user wants to cancel a bookbinding setting through this screen. An OK button 609 is pressed in a case where the user finalizes the bookbinding settings via this screen.

Figure 7:
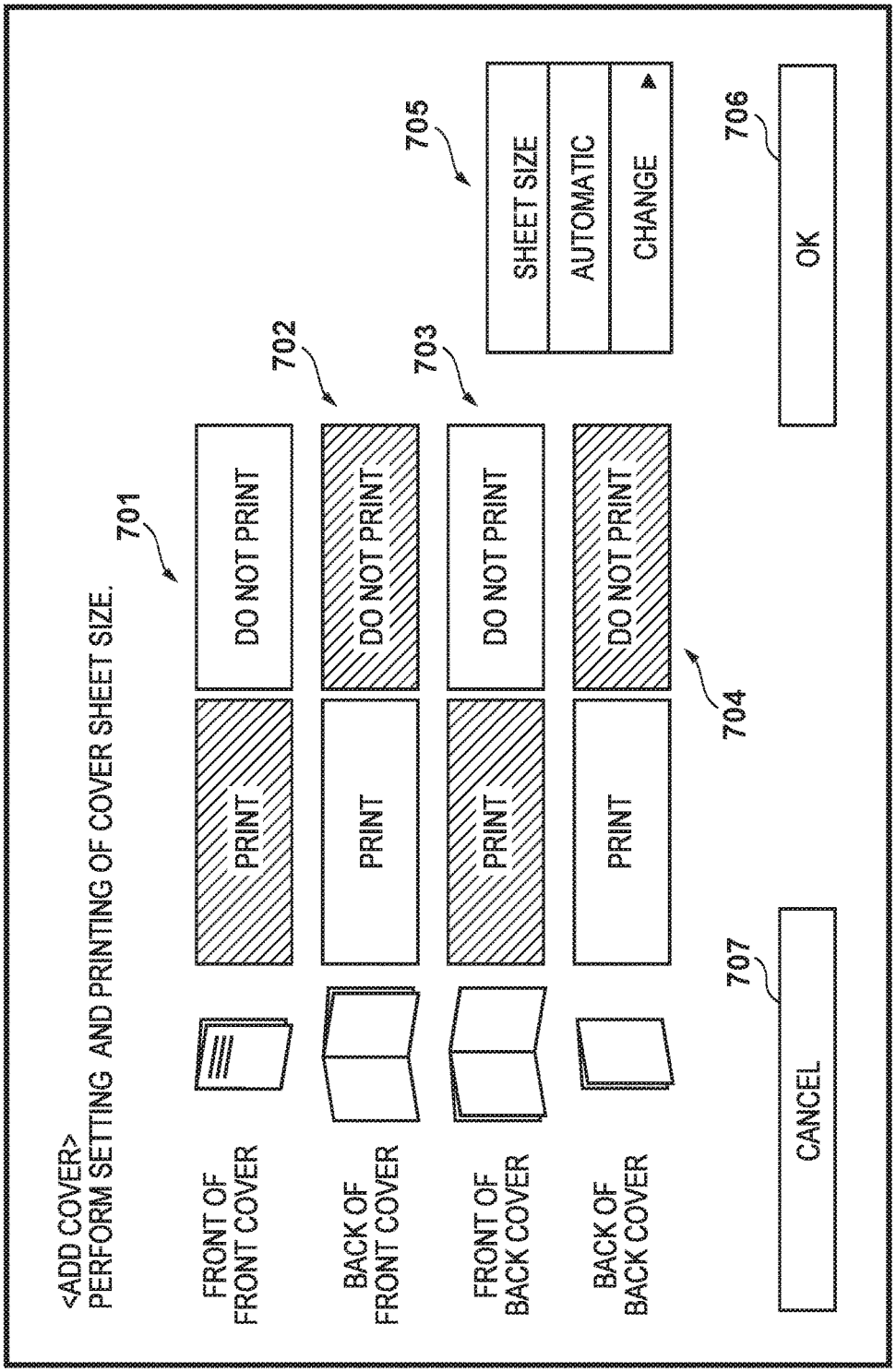
FIG. 7 depicts a view for illustrating an example of a cover setting screen for when the user presses an "add cover" button on the binding copy setting screen in FIG. 6.

FIG. 7 depicts a view for illustrating an example of a cover setting screen for when the user presses the "covering" button 606 on the binding copy setting screen in FIG. 6.

The cover setting screen comprises a button group 701 for selecting whether or not printing is performed on the front of the front cover, a button group 702 for selecting whether or not printing is performed on the back of the front cover, and a button group 703 for selecting whether or not printing is performed on the front of the back cover. Furthermore, a button group 704 for selecting whether or not printing is performed on the back of the back cover is comprised, and a method for printing the cover can be designated by these button groups. In the screen of FIG. 7, setting is performed so that printing is performed on the front of the front cover, printing is not performed on the back of the front cover, printing is performed on the front of the back cover, and printing is not performed on the back of the back cover.

A cover paper setting button 705 is pressed when causing a sheet used for the cover to be different from a sheet for the body of the bookbinding. The cover paper setting button 705 is pressed in a case where the user wishes to change the sheet size, the sheet type, or the paper feed tray for feeding a sheet of the cover. An OK button 706 is pressed in a case where the user finalizes the setting via this screen. If the OK button 706 is pressed, the items set in this screen are finalized and the binding copy setting screen in FIG. 6 is returned to. A cancel button 707 is pressed in a case where the user wishes to cancel settings through this screen. If the cancel button 707 is pressed, the covering setting is not performed and the binding copy setting screen in FIG. 6 is returned to.

Figure 8:
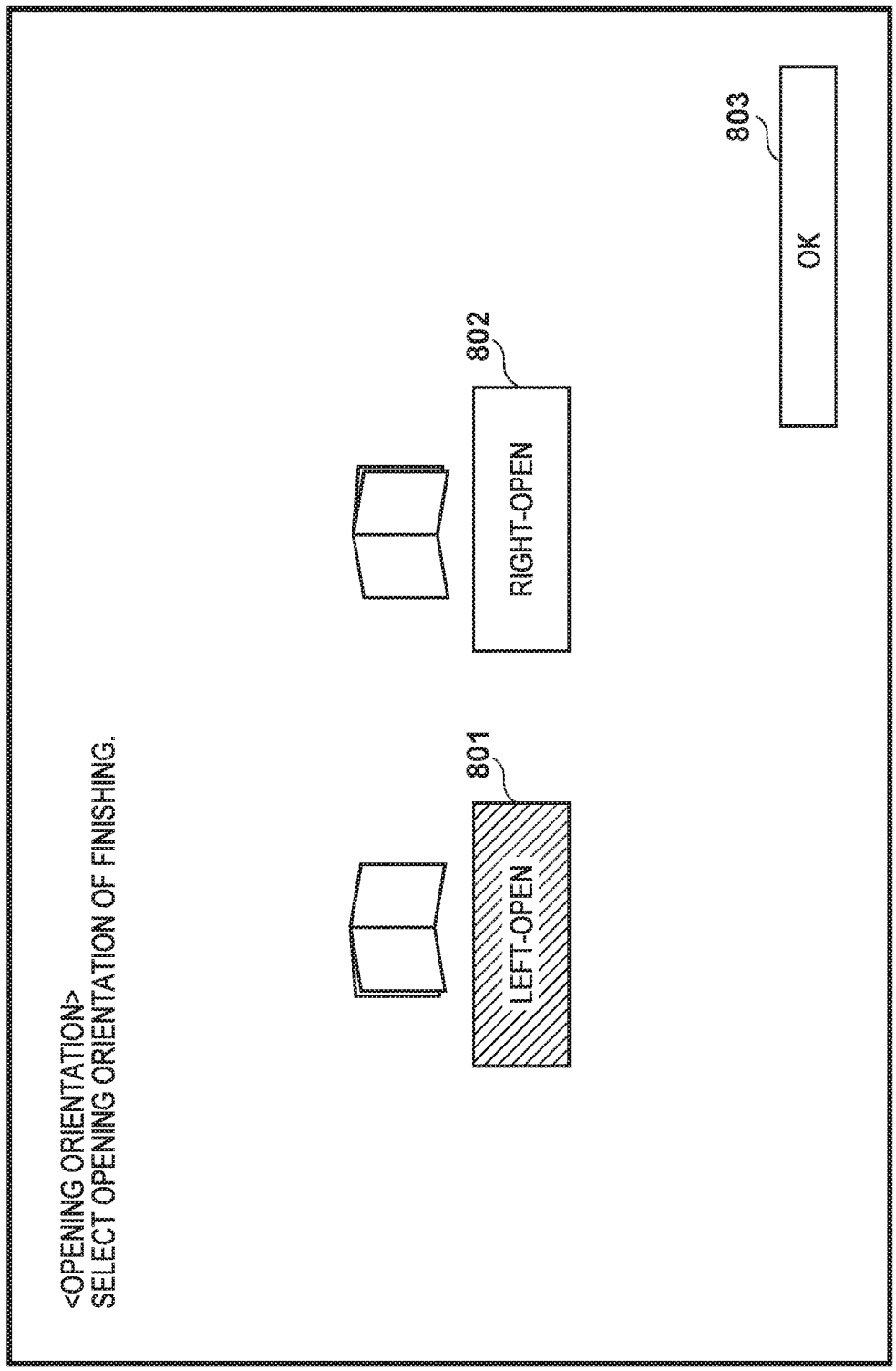
FIG. 8 depicts a view for illustrating an example of an bookbinding opening orientation setting screen displayed when the user presses an "opening orientation" button in the binding copy setting screen in FIG. 6.

FIG. 8 depicts a view for illustrating an example of a bookbinding opening orientation setting screen displayed when the user presses the "opening orientation" button 607 in the binding copy setting screen in FIG. 6.

A left-open instruction button 801 and a right-open instruction button 802 are included in this opening orientation setting screen, and the user instructs an opening orientation of a book by selecting either one. In FIG. 8, a state where left-open is selected is illustrated. An OK button 803 is a button for instructing the setting completion through this screen. When the OK button 803 is pressed, the binding copy setting screen in FIG. 6 is returned to.

When the above setting is completed, the settings data is updated for example as illustrated in Table 1. This setting data is stored in either the memory 202 of the controller 101 or the disk 211, and is referenced upon the execution of the copy job.

TABLE 1

| Bookbinding | | | o |
|---|---|---|---|
| Allocation binding | | | o |
| No allocation binding | | | x |
| Double-sided original | | | x |
| | Open left and right | | x |
| | Open top and bottom | | x |
| Cover | | | o |
| | front of front cover | print | o |
| | | not print | x |
| | back of front cover | print | x |
| | | not print | o |
| | front of back cover | print | x |
| | | not print | o |
| | back of back cover | print | x |
| | | not print | o |
| Opening orientation | left-open | | o |
| | right-open | | x |
| Folding + saddle stitching | | | o |
| Not fold | | | x |

In Table 1, adding cover, left-open, saddle stitching, and allocation binding are designated, and it is set so that printing is performed on the front of the front cover; printing is not performed on the back of the front cover and on the front and the back of the back cover.

Figure 9:
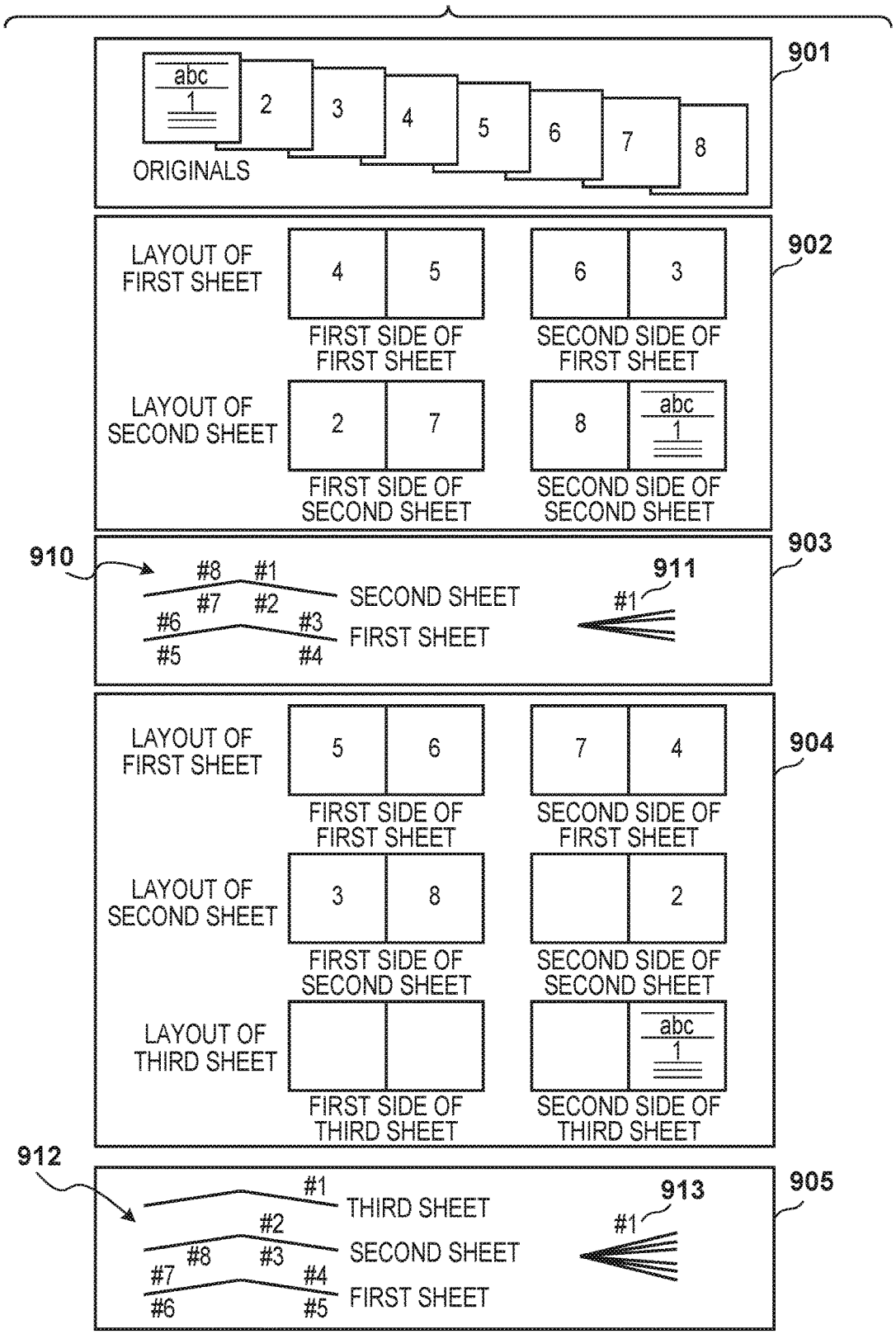
FIG. 9 depicts a view for explaining print processing in a case where images of eight originals are read and printed, and then a saddle stitching with left-open is performed on the printed sheets, and for explaining a result of this bookbinding.

FIG. 9 depicts a view for explaining print processing in a case where images of eight originals are read and printed, and then a saddle stitching with left-open is performed, and explaining a result of this bookbinding.

In the binding copy setting screen in FIG. 6, after setting left-open without performing the covering setting, the user sets the originals indicated by reference numeral 901 in the scanner 102, and presses the start key 402. With this, the originals are read, and image data thereof is generated and stored in the disk 211 of the controller 101. When all originals are read and their image data is stored in the disk 211 in this way, next, the image data stored in the disk 211 is read out and loaded into the memory 202 as bookbinding layout images. Note that, in FIG. 9, a numeral illustrated in each original illustrates a page number of the original.

In the case of this example, as illustrated in a layout example 902, firstly a layout is performed so that an image of the original of the fourth page is laid out on the left side of the first sheet, and an image of the original of the fifth page is laid out on the right side in order to print on the first side (front side) of the first sheet. In this way, when the layout of images on the first side of the first sheet is completed in the memory 202, printing is performed by the printer engine 103 on the first side of the first sheet fed from the paper feed cassette 305. In this way, when the printing on the first side of the first sheet terminates, the sheet is caused to pass through the reversing path 318 to prepare for printing on the second side (back side) of the first sheet.

Next, as illustrated by the layout example 902, to print the second side of the first sheet, an image of the original of the sixth page is laid out on the left side of the sheet and an image of the original of the third page is laid out on the right side. In this way, when layout of the images of the second side of the first sheet in the memory 202 completes, the first sheet passes the reversing path 318, is reversed, and is printed on the second side of the first sheet, and the first sheet, for which double-sided printing is complete, is discharged from the MFP.

With this, as illustrated by reference numeral 910 of a discharge example 903, the first sheet is discharged to the tray of the finisher 104 with the first side downward.

Similarly, in the layout example 902, to print the first side of the second sheet, an image of the original of the second page is laid out on the left side of the second sheet and an image of the original of the seventh page is laid out on the right side. Thus, when in the memory 202 layout of the images of the first side of the second sheet completes, the second sheet is fed from the paper feed cassette 305 and the first side of the second sheet is printed to. Next, to print the second side of the second sheet, an image of the original of the eighth page is laid out on the left side, and an image of the original of the first page is laid out on the right side. Thus, when in the memory 202 the layout of the images of the second side of the second sheet is complete, the second side of the second sheet, which is reversed by the reversing path 318, is printed to, and the second sheet is discharged from the MFP.

With this, as illustrated by the reference numeral 910 of the discharge example 903, the second sheet is stacked on the first sheet with the first side downward. Note that #1 to #8 in the figure illustrate the page numbers of the originals printed on sheets.

The reference numeral 911 of the discharge example 903 denotes a state in which, after these sheets are saddle stitched, folding processing (saddle stitching processing) is performed and the bookbinding product is discharged to the saddle tray 308. Here, the second side of the second sheet is printed to, and discharged with the first page of the original on top. In addition, with the bookbinding product, in accordance with a left-open setting, each image corresponding to respective items of image data of a plurality of originals is printed on respective pages of the bookbinding product in accordance with the page order of the originals.

Next, explanation is given of a case of performing setting that prints on a cover, for example as illustrated in Table 1, by the cover setting screen of FIG. 7. Here, explanation is given of adding a cover, and only printing on the front of the front cover.

In such a case, as illustrated by a layout example 904, to print the first side of the first sheet, the image of the original of the fifth page is laid out on the left side of the sheet and the image of the original of the sixth page is laid out on the right side. In this way, when the layout of the images of the first side of the first sheet is completed in the memory 202, the first sheet is fed from the paper feed cassette 305, and printed on the sheet by the printer engine 103. In this way, when the printing of the first side of the first sheet is finished, the sheet is caused to be reversed via the reversing path 318, and printing on the second side of the first sheet is prepared for. Next, as illustrated by the layout example 904, to print the second side of the first sheet, the image of the original of the seventh page is laid out on the left side of the sheet and the image of the original of the fourth page is laid out on the right side. Thus, when in the memory 202 the layout of the images of the second side of the first sheet is complete, the second side of the first sheet, which passed through the reversing path 318 is printed to.

Similarly, to print the first side of the second sheet, the image of the original of the third page is laid out on the left side of the sheet, and the image of the original of the eighth page is laid out on the right side. Thus, when in the memory 202 layout of the images of the first side of the second sheet completes, the second sheet is fed from the paper feed cassette 305 and the first side of the second sheet is printed to. Next, to print the second side of the second sheet, the image of the original of the second page is laid-out on the right side of the sheet, and nothing is laid-out on the left side of the sheet. Thus, when in the memory 202 the layout of the image of the second side of the second sheet is complete, the second side of the second sheet which is reversed by the reversing path 318 is printed to.

Lastly, because nothing is printed on the first side of the third sheet, the sheet fed from the cassette 305 is caused to pass through as is without performing a layout, and the sheet is reversed via the reversing path 318 to prepare for printing on the second side of the third sheet. Next, to print the second side of the third sheet, the image of the original of the first page is laid out on the right side of the sheet. Thus, when in the memory 202 the layout of the image of the second side of the third sheet is complete, the second side of the third sheet, which is reversed by the reversing path 318, is printed to, and the sheet is discharged from the MFP.

A reference numeral 912 of a discharge example 905 indicates a state in which three sheets that are already printed are discharged to the tray of the finisher 104 and stacked. Here, the first to third sheets are all stacked with their first sides downward. Note that #1 to #8 in the figure indicate the page number of the originals printed on the sheets.

In addition, reference numeral 913 of the discharge example 905 indicates a state in which saddle stitching has been executed for these sheets, and the bookbinding product is discharged to the saddle tray 308. Here, the cover on which the first page of the original has been printed is discharged to be upward. Accordingly, the bookbinding is left-open, the front cover is at the start, and the back of the front cover is not printed. Next, the second page to the eighth page in left-open are a body corresponding to the second page to the eighth page of the originals, and for the back cover at the end, neither its front nor its back is printed to.

Figure 10:
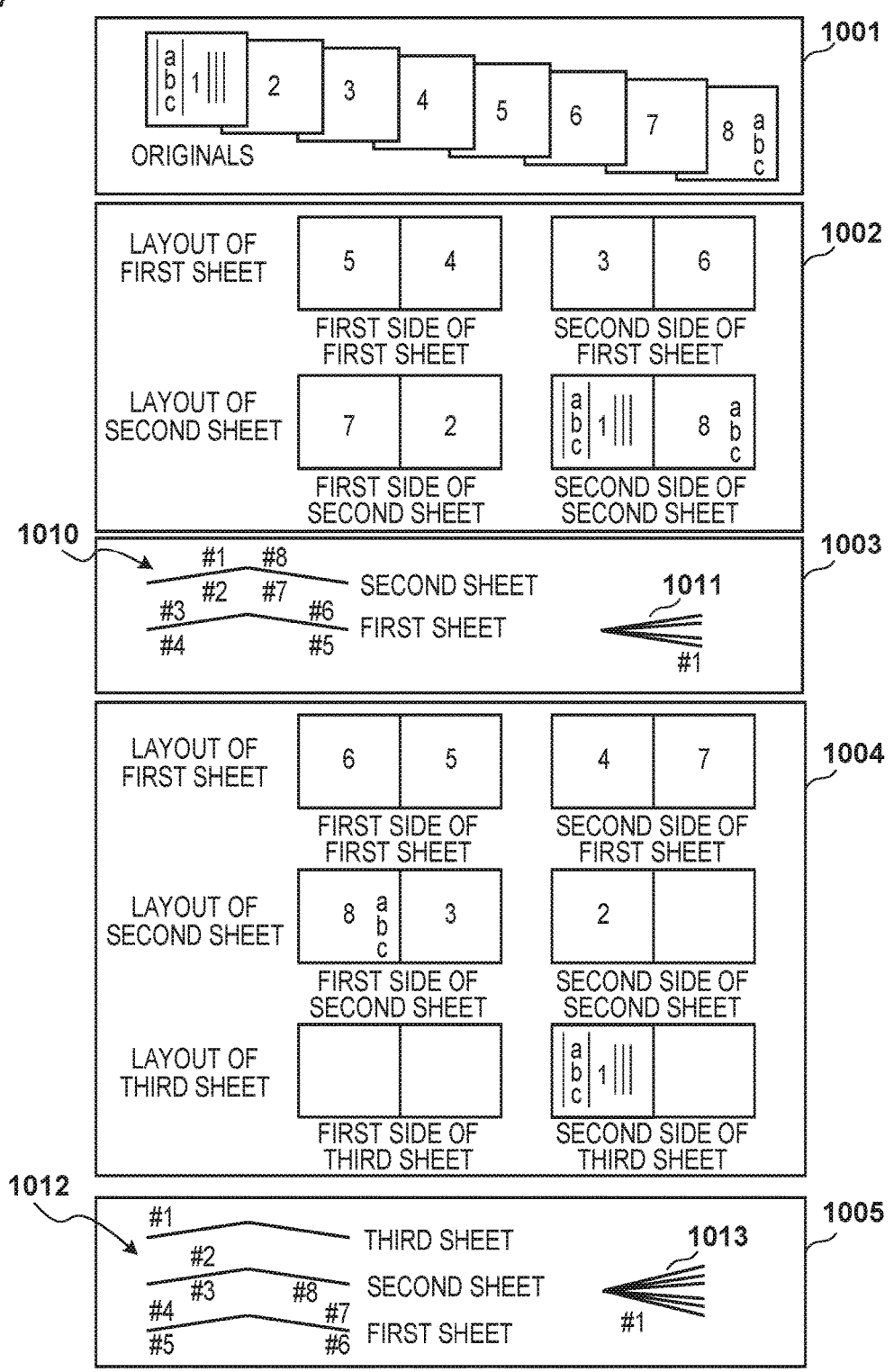
FIG. 10 depicts a view for explaining print processing in a case where images of eight originals are read and printed, and then a saddle stitching with right-open is performed on the printed sheets, and for explaining a result of this bookbinding.

FIG. 10 depicts a view for explaining print processing in a case where images of eight originals are read and printed, and then a saddle stitching with right-open is performed, and for explaining a result of this bookbinding.

Initially, explanation is given of a case in which the covering setting in the binding copy setting screen in FIG. 6 is not performed, and right-open is set.

A user sets originals indicated by reference numeral 1001 in the scanner 102, and presses the start key 402. With this, the originals are read, and image data thereof is generated and stored in the disk 211 of the controller 101. When all originals are read and their image data is stored in the disk 211 in this way, next, the image data stored in the disk 211 is read out and loaded into the memory 202 as bookbinding layout images. Note that, in FIG. 10, a numeral illustrated in each original illustrates a page number of the original.

In this example, as illustrated by a layout example 1002, firstly to print the first side of the first sheet, an image of the original of the fifth page is laid out on the left side of the sheet and an image of the original of the fourth page is laid out on the right side. In this way, when the layout of the images of the first side of the first sheet is completed in the memory 202, the first sheet is fed from the paper feed cassette 305, and printed to by the printer engine 103. In this way, when the printing of the first side of the first sheet is finished, the sheet passes through the reversing path 318 and is reversed to prepare for printing on the second side of the first sheet. Next, as illustrated by the layout example 1002, to print the second side of the first sheet, an image of the original of the third page is laid out on the left side of the sheet and an image of the original of the sixth page is laid out on the right side. Thus, when in the memory 202 layout of the images of the second side of the first sheet is completed, the second side of the first sheet, which is reversed through the reversing path 318, is printed to, and the printed first sheet is discharged from the MFP.

Similarly, to print on the first side of the second sheet, as illustrated by the layout example 1002, an image of the original of the seventh page is laid out on the left side of the sheet, and an image of the original of the second page is laid out on the right side. In this way, when the layout of the images on the first side of the second sheet is completed in the memory 202, the second sheet is fed from the paper feed cassette 305 and printed to by the printer engine 103. Next, to print the second side of the second sheet, an image of the original of the first page is laid out on the left side of the sheet, and an image of the original of the eighth page is laid out on the right side. Thus, when in the memory 202 the layout of the images of the second side of the second sheet is complete, the second side of the second sheet, which passed through the reversing path 318, is printed to, and the second sheet is discharged from the MFP.

As illustrated by reference number 1010 of a discharge example 1003, the first sheet is discharged to the tray of the finisher 104 with the first side thereof downward, and, on the first sheet, the second sheet is stacked with the first side thereof downward. Note that #1 to #8 in the figure indicate the page number of the originals printed on the sheets. In addition, reference numeral 1011 indicates a state in which saddle stitching has been executed for these sheets, and the bookbinding product is discharged to the saddle tray 308. Here, the second side of the second sheet on which the first page of the originals is printed is made downward and the bookbinding product is discharged. Accordingly, the bookbinding produces a bookbinding product that is right-open and is configured by sheets on which the first page to the eighth page of the originals are printed.

Next, explanation is given of a case of performing setting that prints on a cover by the cover setting screen of FIG. 7.

Here, explanation is given of adding a cover, and only printing on the front of the front cover.

Next, in a layout example 1004, to print the first side of the first sheet, the image of the original of the sixth page is laid out on the left side of the sheet and the image of the original of the fifth page is laid out on the right side. In this way, when in the memory 202 the layout of the images of the first side of the first sheet is completed, the first sheet is fed from the paper feed cassette 305, and printed to by the printer engine 103. In this way, when the printing of the first side of the first sheet is finished, the first sheet passes through the reversing path 318 and is reversed to prepare for printing on the second side of the first sheet. Next, as illustrated by the layout example 1004, to print the second side of the first sheet, the image of the original of the fourth page is laid out on the left side of the sheet and the image of the original of the seventh page is laid out on the right side. Thus, when in the memory 202 the layout of the images of the second side of the first sheet is complete, the second side of the first sheet, which passed through the reversing path 318, is printed to, and the first sheet is discharged from the MFP.

Similarly, to print the first side of the second sheet, the image of the original of the eighth page is laid out on the left side of the sheet, and the image of the original of the third page is laid out on the right side. In this way, when in the memory 202 the layout of the images on the first side of the second sheet is completed, the second sheet is fed from the paper feed cassette 305 and printed to by the printer engine 103. In this way, when the printing of the first side of the second sheet is finished, the second sheet passes through the reversing path 318 and is reversed to prepare for printing on the second side of the second sheet. Next, as illustrated by the layout example 1004, to print the second side of the second sheet, the image of the original of the second page is laid-out on the left side of the sheet and nothing is laid-out on the right side. Thus, when in the memory 202 the layout of the image of the second side of the second sheet is complete, the second side of the second sheet, which passed through the reversing path 318, is printed to, and the second sheet is discharged from the MFP.

Lastly, because nothing is printed on the first side of the third sheet, the third sheet fed from the cassette 305 is caused to pass through as is without performing a layout, and the third sheet is reversed through the reversing path 318 to prepare for printing on the second side of the third sheet. Next, to print the second side of the third sheet, the image of the original of the first page is laid-out on the left side of a sheet, and nothing is laid-out on the right side of the sheet. Thus, when in the memory 202 the layout of the image of the second side of the third sheet is complete, the second side of the third sheet, which passed through the reversing path 318, is printed to, and the third sheet is discharged from the MFP.

A reference numeral 1012 of a discharge example 1005 indicates a state in which three sheets are discharged to the tray of the finisher 104 and stacked. In addition, reference numeral 1013 indicates a position of sheets and images when they are discharged to the saddle tray 308 after saddle stitching. If discharged to the saddle tray 308, because saddle stitching is performed, a cover is discharged downward.

Reference numeral 1013 of the discharge example 1005 indicates a state in which after saddle stitching has been executed for these sheets, the bookbinding product is discharged to the saddle tray 308. Here, the cover on which the first page of the original has been printed is discharged to be downward. Accordingly, the bookbinding is right-open, the front cover is at the start, and the back of the front cover is not printed. Next the second page to the eighth page in right-open become a body corresponding to the second page to the eighth page of the originals, and for the back cover at the end, neither its front nor its back of the back cover is printed to.

FIG. 11A to FIG. 11D depict views for explaining two examples in a case where saddle stitching and discharging are performed in the finisher 104 according to the first embodiment.

Figure 11A:
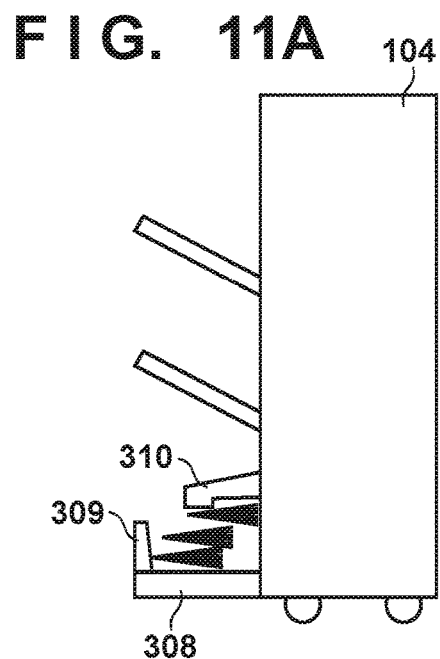
FIG. 11A to FIG. 11D depict views for explaining two examples in a case where the saddle stitching and discharging are performed in a finisher according to the first embodiment.

FIG. 11A illustrates a state in which discharged bookbinding products are held back with the stopper 309 in a standing upright state. In such a case, because bookbinding products are stacked on the saddle tray 308, if a plurality of bookbinding products are output, a full tray is detected when the stacking height of the bookbinding products reaches the position of the tray sensor 310. When a full tray is detected, discharge of bookbinding products is suspended.

Figure 11B:
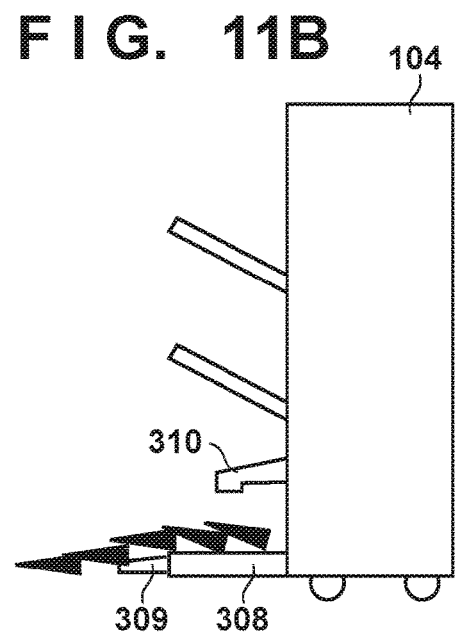

FIG. 11B depicts a view for illustrating a state in which the stopper 309 is laid down so as to not function. Here, because the stopper 309 is laid down, a state in which bookbinding products are not stacked on the saddle tray 308 and overflow outside of the saddle tray 308 is entered. Accordingly, in such a case a full tray cannot be detected by the tray sensor 310. In such a case, it is possible to endlessly perform discharge of bookbinding products.

Figure 11C:
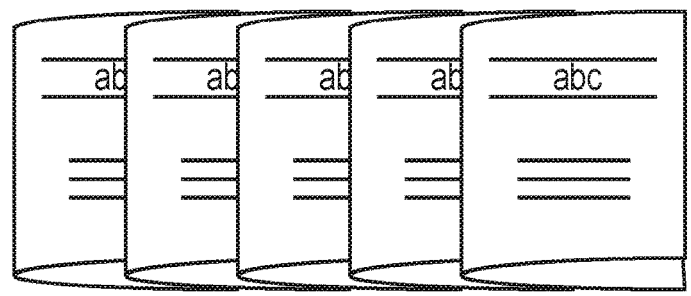

FIG. 11C depicts a view seen from above of a state in which bookbinding products book-bound with left-open, as illustrated by the reference numeral 905 of FIG. 9, are endlessly discharged as illustrated in FIG. 11B.

Figure 11D:
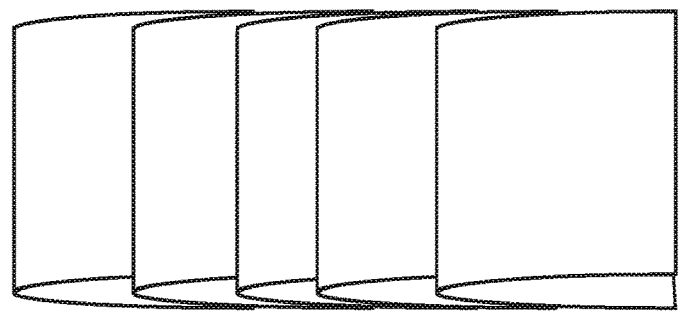

FIG. 11D depicts a view seen from above of a state in which bookbinding products book-bound with right-open, as illustrated by the reference numeral 1005 of FIG. 10, are endlessly discharged as illustrated in FIG. 11B.

In this way, in the case of bookbinding with left-open, because the printing surface of the cover is upward, it is possible to confirm whether printing has been performed, but in the case of bookbinding with right-open, because the printing surface of the cover is downward, from appearance it looks as if bookbinding products with blank sheets have been discharged.

Figure 12:
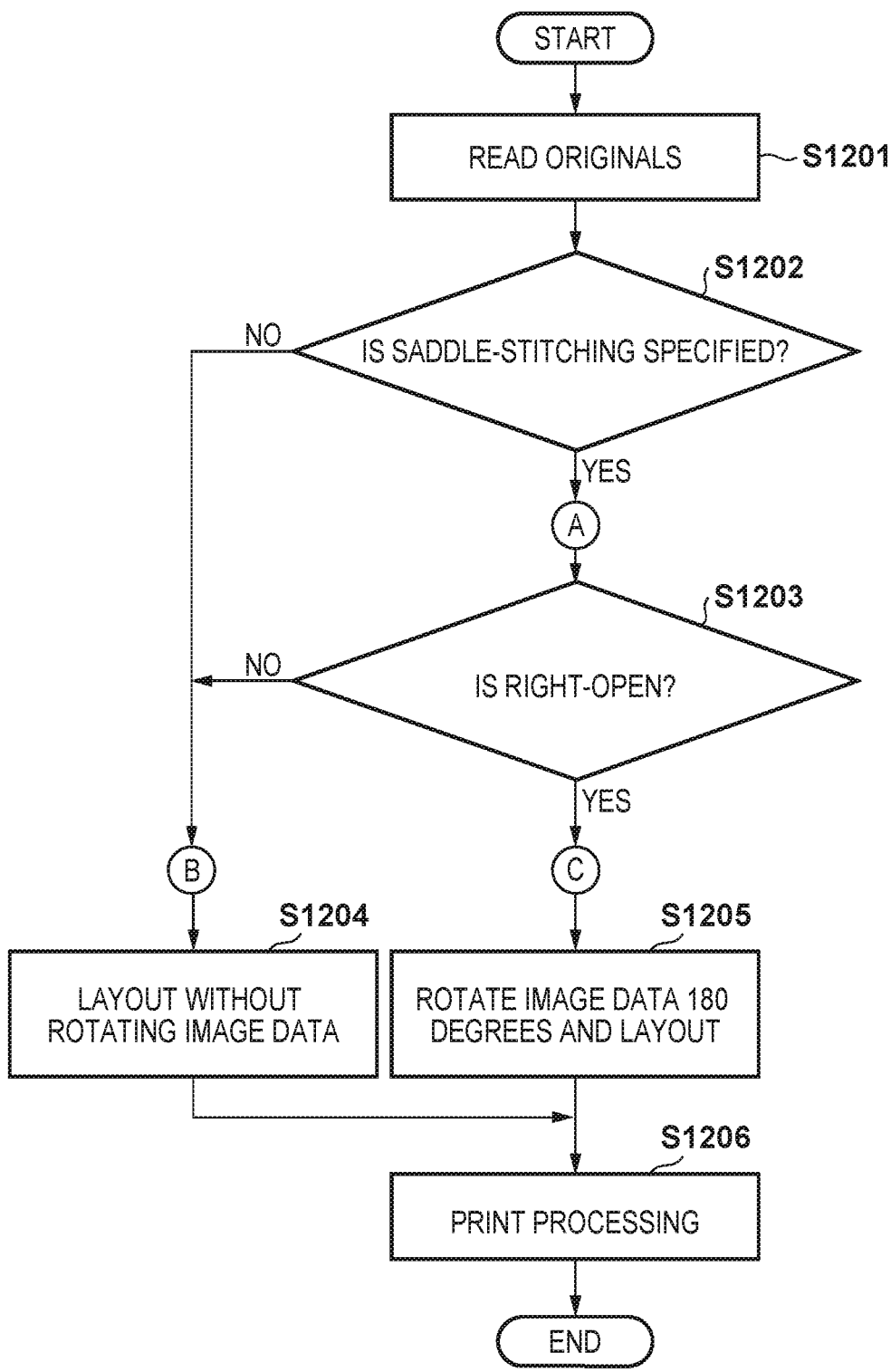
FIG. 12 is a flowchart for describing a process for when the bookbinding print is designated in the MFP according to the first embodiment.

FIG. 12 is a flowchart for describing a process for when the bookbinding print is designated in the MFP according to the first embodiment. Note that, a program that executes this process is installed on the disk 211, and at the time of execution the program is deployed into the memory 202 and executed under the control of the CPU 201.

The process is started by a user pressing the start key 402 of the console unit 106 after performing setting of the bookbinding by the binding copy setting screen of FIG. 6.

In step S1201 the CPU 201 controls the scanner 102, executes reading of originals, obtains image data of these originals, and stores it in the disk 211. Next, the processing proceeds to step S1202, and the CPU 201 refers to binding copy setting data stored in the memory 202, for example as illustrated in Table 1. Here the CPU 201 determines whether "fold and saddle stitching" (saddle stitching) has been set; if it is determined not to be set the processing proceeds to step S1204, and the CPU 201 loads the image data into the memory 202, for example as illustrated by reference numerals 902 or 904 of FIG. 9. Then the processing proceeds to step S1206, the image data is output to the printer engine 103 and printed, and this process terminates.

Meanwhile, in step S1202 if the CPU 201 determines that "fold and saddle stitching" is set, the processing proceeds to step S1203, and an opening orientation of the set bookbinding is referred to. Here, if the CPU 201 determines left-open, the processing proceeds to step S1204, the CPU 201 loads the image data into the memory 202, for example as illustrated by reference numerals 902 or 904 of FIG. 9, print processing is performed in step S1206, and the process terminates.

In contrast, in step S1203 if the CPU 201 determined right-open, the processing proceeds to step S1205. In step S1205, the CPU 201 rotates the image data 180 degrees, for example as illustrated by later-described reference numerals 1302 and 1304 of FIG. 13, and loads it into the memory 202. Then, the processing proceeds to step S1206, and the CPU 201 prints the loaded image data by outputting it to the printer engine 103, and this processing terminates.

Figure 13:
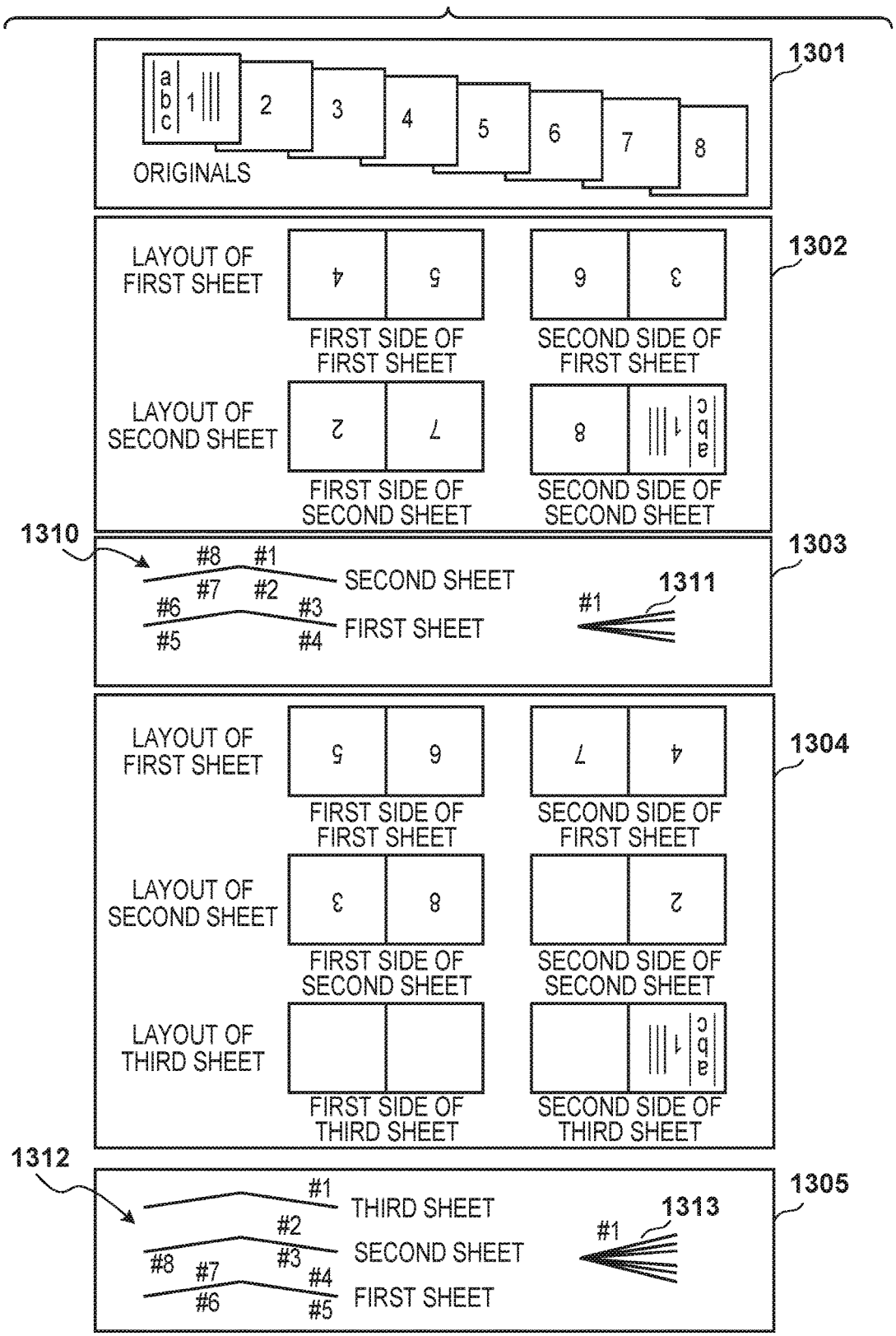
FIG. 13 depicts a view for explaining print processing in the MFP according to the first embodiment in a case where eight originals are read and printed, and then a saddle stitching with right-open is performed, and a result of this bookbinding.

FIG. 13 depicts a view for explaining print processing in the MFP according to the first embodiment in a case where images of eight originals are read and printed, and then a saddle stitching with right-open is performed, and for explaining a result of this bookbinding.

Here, after setting right-open without performing a covering setting in the binding copy setting screen, and when the user sets the originals in reference numeral 1301 to the scanner 102, and presses the start key 402, image data of the originals is stored in the disk 211. In this way, after the image data of all the originals is stored in the disk 211, the image data is read and loaded into the memory 202 as bookbinding layout images.

In the case of this example, as illustrated in a layout example 1302, firstly, to print to the first side of the first sheet, a layout is performed so that an image of the original of the fifth page is rotated 180 degrees and is laid out on the right side of the sheet, and an image of the original of the fourth page is rotated 180 degrees and is laid out on the left side. Thus, when in the memory 202 the layout of the images of the first side of the first sheet is complete, the first sheet is fed from the paper feed cassette 305 and printed to by the printer engine 103. When the printing of the first side of the first sheet is finished, the first sheet is caused to be reversed via the reversing path 318, and printing on the second side of the first sheet is prepared for.

Next, as illustrated in the layout example 1302, to print the second side of the first sheet, an image of the original of the third page is rotated 180 degrees and laid out on the right side of the sheet, and an image of the original of the sixth page is rotated 180 degrees and laid out on the left side of the sheet. Thus, when in the memory 202 layout of the images of the second side of the first sheet is completed, the second side of the first sheet, which has been reversed via the reversing path 318, is printed to, and the first sheet, for which double-sided printing has completed, is discharged from the MFP.

Similarly, to print the first side of the second sheet, an image of the original of the seventh page is rotated 180 degrees and laid out on the left side of the sheet, and an image of the original of the second page is rotated 180 degrees and is laid out on the right side. Thus, when in the memory 202 layout of the images of the first side of the second sheet completes, the second sheet which is fed from the paper feed cassette 305 is printed to. Next, to print the second side of the second sheet, an image of the original of the first page is rotated 180 degrees and laid out on the right side of the sheet, and an image of the original of the eighth page is rotated 180 degrees and is laid out on the left side. Thus, when layout of the images of the second side of the second sheet is completed in the memory 202, the second side of the second sheet, which has been reversed via the reversing path 318, is printed to, and the second sheet, which has been subject to double-sided printing, is discharged from the MFP.

Reference numeral 1310 of a discharge example 1303 illustrates two sheets discharged to the tray of the finisher 104, and here these sheets are stacked with the first sides thereof downward. Reference numeral 1311 denotes a bookbinding product stacked in the saddle tray 308. Upon discharged to the saddle tray 308, because saddle stitching has completed, the product is discharged with the second side of the second sheet facing upwards.

Next, explanation will be given of a case in which, by the cover setting screen of FIG. 7, a setting for printing a cover is performed (in the example of Table 1, only the front of the front cover is printed to, and the back of the front cover as well as the front and back of the back cover are not printed to).

As illustrated in a layout example 1304, to print the first side of the first sheet, the image of the original of the sixth page is rotated 180 degrees and laid out on the right side of the sheet, and the image of the original of the fifth page is rotated 180 degrees and laid out on the left side of the sheet. In this way, when in the memory 202 the layout of images on first side of the first sheet is completed, the first sheet is fed from the paper feed cassette 305, and printed to by the printer engine 103. When the printing of the first side of the first sheet is finished, the first sheet is caused to be reversed via the reversing path 318, and printing on the second side of the first sheet is prepared for.

Next, as illustrated in the layout example 1304, to print the second side of the first sheet, the image of the original of the fourth page is rotated 180 degrees and laid out on the right side of the sheet, and the image of the original of the seventh page is rotated 180 degrees and laid out on the left side. Thus, when in the memory 202 layout of the images of the second side of the first sheet is completed, the second side of the first sheet, which has been reversed via the reversing path 318, is printed to, and the first sheet, which has been subject to double-sided printing, is discharged from the MFP.

Similarly, to print the first side of the second sheet, the image of the original of the eighth page is rotated 180 degrees and laid out on the right side of the sheet, and the image of the original of the third page is rotated 180 degrees and is laid out on the left side. In this way, when the layout of the images on the first side of the second sheet is completed in the memory 202, the second sheet is fed from the paper feed cassette 305 and printed to by the printer engine 103. When the printing of the first side of the second sheet is finished, the sheet is caused to be reversed via the reversing path 318, and printing on the second side of the second sheet is prepared for. To print the second side of the second sheet, the image of the original of the second page is rotated 180 degrees and laid-out on the right side of the sheet, and nothing is laid-out on the left side of the sheet. Thus, when in the memory 202 layout of the image of the second side of the second sheet is completed, the second side of the second sheet, which has been reversed via the reversing path 318, is printed to, and the second sheet, which has been subject to double-sided printing, is discharged from the apparatus.

Lastly, because nothing is printed on the first side of the third sheet, the third sheet fed from the cassette 305 is caused to pass through as is without performing a layout, and the sheet is reversed via the reversing path 318 to prepare for printing on the second side of the third sheet. Then, to print the second side of the third sheet, the image of the original of the first page is rotated 180 degrees and laid-out on the right side of the sheet, and nothing is laid-out on the left side. Thus, when in the memory 202 layout of the image of the second side of the second sheet is completed, the second side of the third sheet, which has been reversed via the reversing path 318, is printed to, and the third sheet, which has been subject to double-sided printing, is discharged from the MFP.

The reference number 1312 of a discharge example 1305 indicates a state in which discharge is performed to the tray of the finisher 104, and the reference number 1313 indicates a bookbinding product discharged to the saddle tray 308. When discharged to the saddle tray 308, the second side of the third sheet to which the original of the first page has been printed is the front cover and is positioned upward. Thereby, with a left-open bookbinding product that includes sheets on which from the front cover the first page to the eighth page of the originals are printed, and a back cover at the end on which nothing is printed is formed.

In such a case, if a bookbinding product is discharged as illustrated in FIG. 11B, for example, even if the back cover is comprised by a blank sheet on which nothing is printed, it does not look like consecutive blank sheets. Accordingly, even if an abnormality has occurred in printing and a sheet to which printing has not been performed is discharged, this can be easily distinguished.

Figure 14:
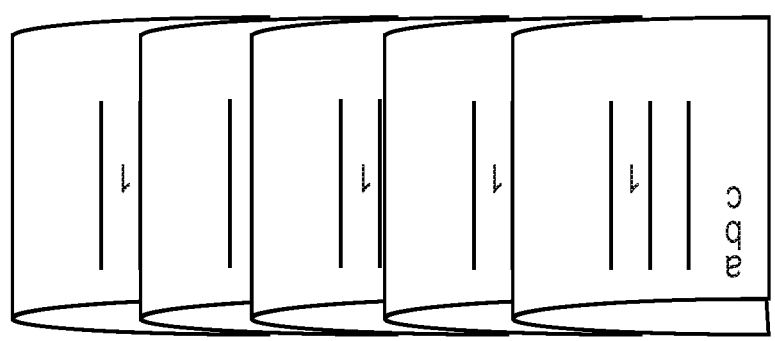
FIG. 14 depicts a view seen from above of a state where bookbinding products generated by print processing, which reads eight originals and prints and performs the saddle stitching with right-open, and bookbinding processing thereon, are discharged as shown in FIG. 11B in the MFP according to the first embodiment.

FIG. 14 depicts a view seen from above of a state where bookbinding products generated by print processing, which reads and prints eight originals and performs the saddle stitching with right-open, and bookbinding processing thereon, are discharged as shown in FIG. 11B in the MFP according to the first embodiment.

Because by virtue of this, bookbinding products are discharged in a state in which the fronts of the front covers of the products are always facing upward, there is the effect that blank sheets which can be seen continuously disappear, and an abnormality of printing can be easily detected.

By the first embodiment, as explained above, if the setting for the opening of the bookbinding is right-open, by rotating the orientation of an image laid-out on a sheet 180 degrees, it is possible to discharge the bookbinding product with the front cover of the bookbinding product as always facing upward. With this, even if bookbinding products are discharged as in FIG. 11B, for example, it is possible to confirm images of the sheet surfaces of the bookbinding products, and is it possible to execute a large volume bookbinding jobs with peace of mind.

Second Embodiment

Next, explanation will be given for a second embodiment of the present invention. In the second embodiment, in accordance with whether images are printed to the front of the front cover and the back cover, and not just whether a bookbinding product is right-open or left-open, the orientation of an image to be laid-out on a sheet is caused to be rotated 180 degrees. With this, explanation is given of an example in which it is possible to obtain an effect similar to that of the above-described first embodiment. Note that the configuration of the image forming apparatus according to the second embodiment and the configuration of the system overall are similar to those of the previously described first embodiment, so explanation thereof is omitted.

Figure 15A:
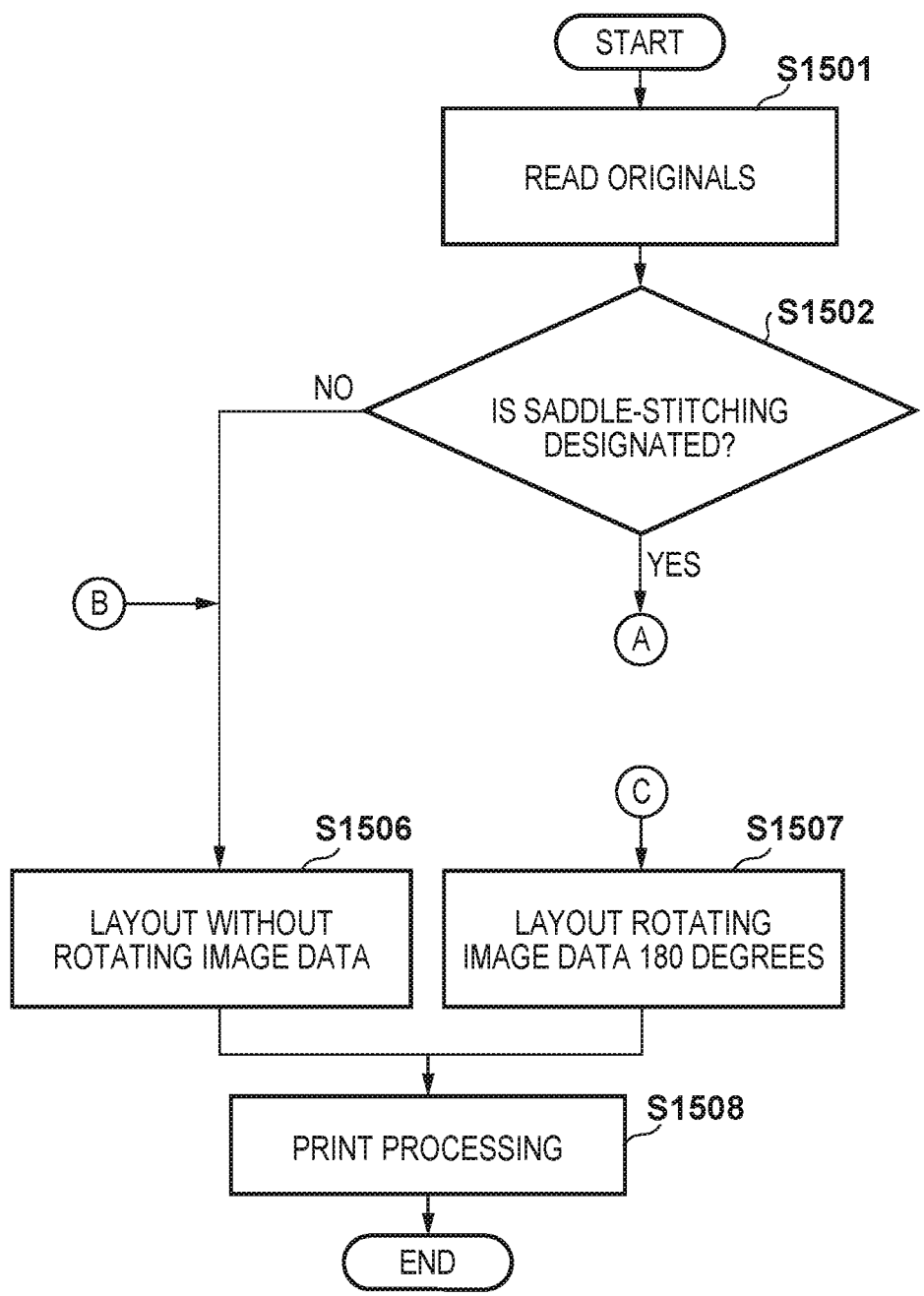
FIGS. 15A and 15B are flowcharts for describing a process for when print process for bookbinding is designated in the MFP according to a second embodiment.
Figure 15B:
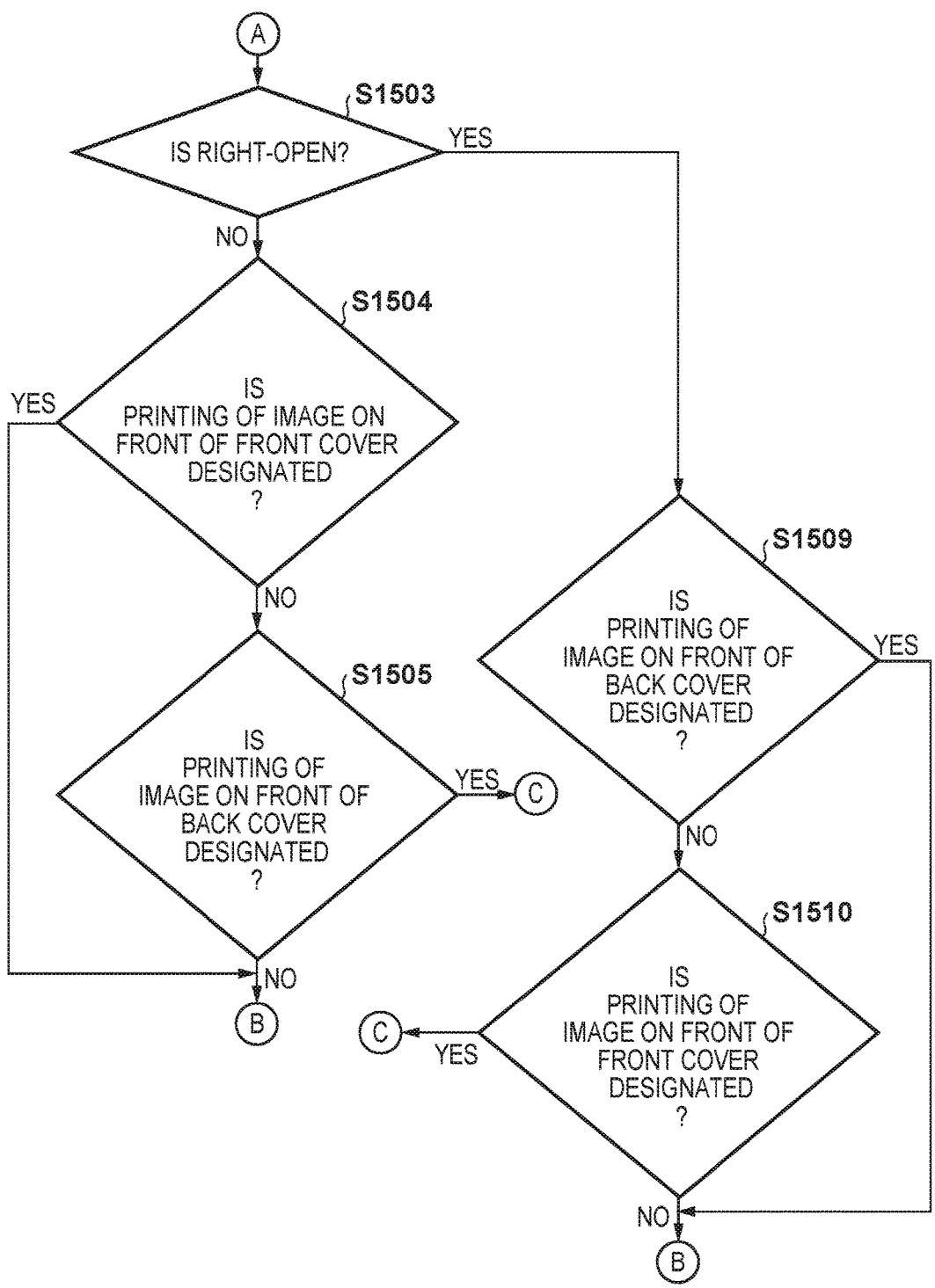

FIGS. 15A and 15B are flowcharts for describing a process for when the bookbinding print is designated in the MFP according to the second embodiment. Note that, a program that executes this process is installed on the disk 211, and at the time of execution the program is deployed into the memory 202 and executed under the control of the CPU 201. Note that the process is started by a user pressing the start key 402 of the console unit 106 after performing setting of the bookbinding in the binding copy setting screen of FIG. 6.

Firstly, in step S1501 the CPU 201 controls the scanner 102, executes reading of originals, obtains image data of the originals, and stores it in the disk 211. Next, the processing proceeds to step S1502 and the CPU 201 determines whether in the bookbinding "fold and saddle stitching" (saddle stitching) is designated. Here, if the saddle stitching is not designated, in step S1506, similarly to described previously step S1204 of FIG. 12, the CPU 201 loads the image data into the memory 202 without rotation, as illustrated by reference numerals 902 or 904 of FIG. 9, for example. Then, the processing proceeds to step S1508, and similarly to in step S1206 of FIG. 12, that the image data is printed by outputting it to the printer engine 103, and this processing terminates.

Figure 16A:
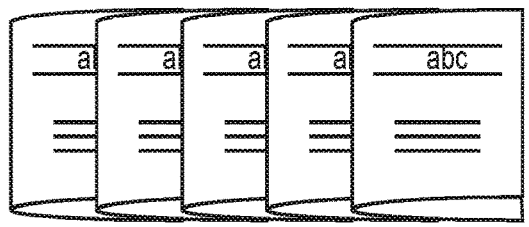
FIGS. 16A to 16E depict views for illustrating an example of discharging bookbinding products in the second embodiment.

Meanwhile, in step S1502 upon determining that the saddle stitching is designated, the CPU 201 proceeds to step S1503 (FIG. 15B), refers to the opening orientation, which is set in the screens of FIG. 6 and FIG. 8, of the bookbinding stored in the memory 202, and determines whether it is right-open or left-open. Here, if determined to be left-open, the processing proceeds to step S1504, the CPU 201 refers to the item of "add cover" in Table 1, and determines whether "print" on "the front of the front cover" is set. Here, if printing on the front of the front cover is set, the processing proceeds to step S1506, and as previously explained the image data is loaded and printed. In such a case, when the bookbinding products are lined up, as illustrated in FIG. 16A, for example, they are discharged with the front of the front cover of the bookbinding product upward.

Figure 16D:
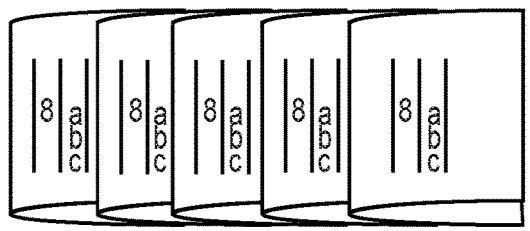
Figure 16B:
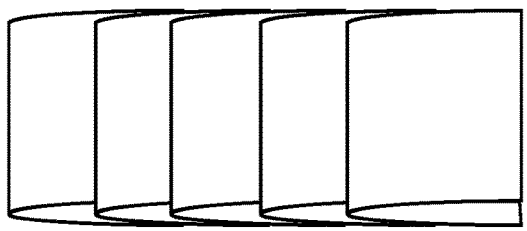

In addition, in step S1504 if the CPU 201 determines that printing to the front cover is not set, the processing proceeds to step S1505, the CPU 201 refers to Table 1 and determines whether "print" to "the front of the back cover" is set. Here, if printing on the front of the back cover is not set, the processing proceeds to step S1506, and as previously explained the image data is loaded and printed. In such a case, because images are not present on the front of the front cover or the front of the back cover, when the bookbinding products are lined up it is as illustrated in FIG. 16B, for example.

Figure 16E:
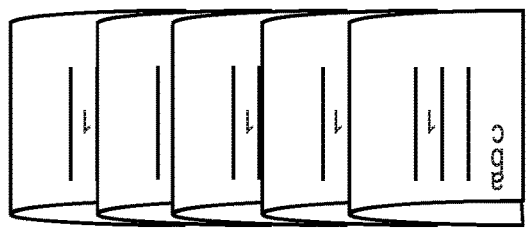
Figure 16C:
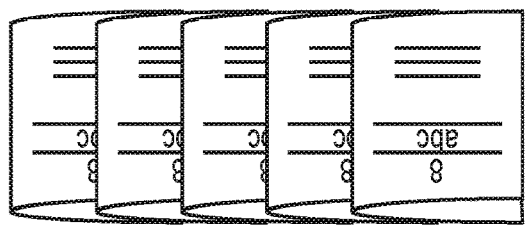

On the other hand, in step S1505 if the CPU 201 determines that "print" to "the front of the back cover" is set, the processing proceeds to step S1507. In step S1507, the CPU 201, similarly to previously described step S1205 of FIG. 12, rotates the image data 180 degrees, for example as illustrated by previously described the reference numerals 1302 and 1304 of FIG. 13, and loads it into the memory 202. Then, the processing proceeds to step S1508, and the CPU 201 prints the loaded image data by outputting it to the printer engine 103, and this processing terminates. In such a case, when the bookbinding products are lined up, for example as illustrated in FIG. 16C, the bookbinding products are discharged with the front of the back cover facing upward, rotated 180 degrees.

Next, explanation is given of processing for a case in which right-open is determined in step S1503.

If the CPU 201 determines right-open in step S1503, the processing proceeds to step S1509, and the CPU 201 refers to the item of "add cover" of Table 1, and determines whether "print" on "the front of the back cover" is set. If it is determined in step S1509 that printing on the front of the back cover is set, the processing proceeds to step S1506, printing is performed in accordance with a layout in which the image data is not rotated, and the bookbinding processing is performed. In such a case, when the bookbinding products are lined up, as illustrated in FIG. 16D, for example, they are discharged with the front of the back cover facing upward.

On the other hand, in step S1509 if the CPU 201 determines that printing to the front of the back cover is not set, the processing proceeds to step S1510, the CPU 201 refers to Table 1 and determines whether it is set to print to the front of the front cover. In step S1510, if the CPU 201 determines that printing to the front of the front cover is not set, the processing proceeds to step S1506, and the CPU 201 sets a layout in which the image data is not rotated in step S1506, and prints in step S1508. In such a case, because images are not present on the front of the front cover and the front of the back cover, in such a case if the bookbinding products are arranged, bookbinding products in which blank covers are upward are discharged, as for example illustrated in FIG. 16B.

Meanwhile, in step S1510, if the CPU 201 determines that printing to the front of the front cover is set, the processing proceeds to step S1507, and the CPU 201 sets a bookbinding layout in which the image data is rotated 180 degrees, and prints in step S1508. In such a case, when the bookbinding products are lined up, as illustrated in FIG. 16E, for example, the bookbinding products are discharged with the image of the front of the front cover facing upward.

By the second embodiment, as explained above, whether the opening orientation of the bookbinding is the right side or the left side, if an image is formed on the front of the front cover or the front of the back cover, discharging is always performed with the front surfaces of the bookbinding products to which printing has been performed facing upward. Thereby, even if the stopper 309 is laid down and the bookbinding products are discharged endlessly as in FIG. 11B, for example, a user can easily recognize whether the sheets of the bookbinding products have been normally printed.

Third Embodiment

Next, explanation will be given for a third embodiment of the present invention. In the third embodiment, whether to perform the above described processing is determined in accordance with the number of copies of bookbinding products to create. In other words, if the number of copies of the bookbinding products is one copy, because it can be considered that the user will immediately take the bookbinding product in hand and confirm it after the bookbinding product has been discharged, the bookbinding print is performed without performing control as in the above described first and second embodiments. However, if the number of copies of the bookbinding products is a plurality, because it is considered that a situation as in the above described FIG. 11B would occur, the above described first or second embodiment is applied. Note that the configuration of the image forming apparatus according to the third embodiment and the configuration of the system overall are similar to those of the previously described first embodiment, so explanation thereof is omitted.

Figure 17:
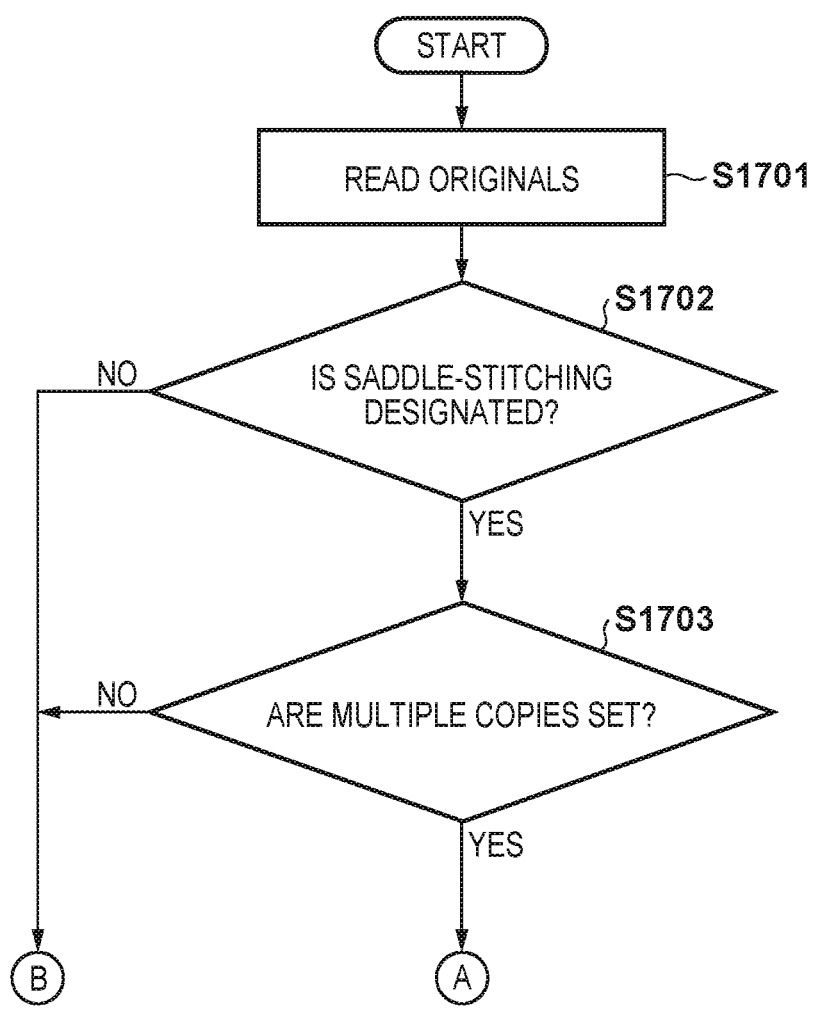
FIG. 17 is a flowchart for describing a portion of a process for when print process for bookbinding is designated in the MFP according to a third embodiment.

FIG. 17 is a flowchart for describing a portion of a process for when a bookbinding print is designated in the MFP according to the third embodiment. Note that, a program that executes this process is installed on the disk 211, and at the time of execution the program is deployed into the memory 202 and executed under the control of the CPU 201. Note that the process is started by a user pressing the start key 402 of the console unit 106 after performing setting of the bookbinding in the binding copy setting screen of FIG. 6. Note that this flowchart illustrates processing until A and B of the flowcharts in FIG. 12 and FIGS. 15A and 15B.

Firstly, in step S1701 the CPU 201 controls the scanner 102, executes reading of originals, obtains image data of the originals, and stores it in the disk 211. Next, the processing proceeds to step S1702 and the CPU 201 determines whether in the bookbinding "fold and saddle stitching" (saddle stitching) is designated or not. Here, if the saddle stitching is not designated, the processing proceeds to step S1506 of FIG. 15A, and similarly to described previously step S1204 of FIG. 12, the CPU 201 loads the image data into the memory 202 without rotation, as illustrated by reference numerals 902 or 904 of FIG. 9, for example. Then, the processing proceeds to step S1508, and similarly to in step S1206 of FIG. 12, that image data is printed by outputting it to the printer engine 103, and this processing terminates.

Meanwhile, if the CPU 201 determines that the saddle stitching is designated in step S1702, the processing proceeds to step S1703, and the CPU 201 determines whether or not the number of copies that the user set via the console unit 106, for example, is 2 or more (multiple copies). If it determined that it is not multiple copies, the processing proceeds to step S1506 of FIG. 15A, and the CPU 201 loads the image data into the memory 202 without rotation. Then, the processing proceeds to step S1508, and similarly to in step S1206 of FIG. 12, that image data is printed by outputting it to the printer engine 103, and this processing terminates. Meanwhile, if it is determined that multiple copies are set in step S1703, the processing proceeds to step S1203 of FIG. 12 or step S1503 of FIG. 15B. Then, the CPU 201, in accordance with whether the bookbinding product is right-open or left-open, and whether or not images are printed on the front of the front cover and the back cover, causes the image data to rotate and prints.

By virtue of the third embodiment, if multiple copies are set, a user can easily recognize whether the sheets of the bookbinding products have been normally printed. If only 1 copy of the bookbinding product is designated, a user would take the bookbinding product immediately to confirm it, so the above described processing in the first and second embodiments will become unnecessary.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-020613, filed Feb. 4, 2015, which is hereby incorporated by reference herein in its entirety.

What is claimed is:

1. A printing apparatus comprising:
   a receiver configured to receive image data;
   a printer engine configured to print an image on a sheet based on the image data;
   a saddle finisher configured to perform saddle stitching on the sheet conveyed from the printer engine and to discharge a booklet including the sheet; and
   a controller configured to,
   (i) in a case that an opening orientation of the saddle stitching is designated to be left-open and a print on an outer surface of a front cover of the booklet is designated and in a case that an opening orientation of the saddle stitching is designated to be right-open and a print on an outer surface of a back cover of the booklet is designated, control the printer engine to print the image on the sheet without rotating the image data 180 degrees, and,
   (ii) in a case that an opening orientation of the saddle stitching is designated to be right-open and the print on the outer surface of the back cover of the booklet is not designated, control the printer engine to print the image on the sheet with rotating the image data 180 degrees,
   wherein the booklet is discharged from the saddle finisher with a printed surface of the booklet facing upward in both the case of the orientation of the saddle stitching being left-open and the case of the orientation of the saddle stitching being right-open.

2. The printing apparatus according to claim 1, further comprising a user interface that is operable to cause a user to designate a number of copies of the booklet,
   wherein the controller controls to, if the designated number of copies is equal or more than two, rotate the image data 180 degrees in accordance with the saddle stitching with left-open or right-open, and
   wherein if the designated number of copies is one, the controller lays out the image data input by the receiver without rotating 180 degrees regardless of the saddle stitching with left-open or right-open.

3. The printing apparatus according to claim 1, wherein the image data received by the receiver is image data of a plurality of pages and the controller is further configured to control the printer engine to print two images, each image corresponding to one of the plurality of pages, on one face of the sheet.

4. The printing apparatus according to claim 1, wherein the receiver reads a plurality of originals, and receives image data of the read plurality of originals as the image data.

5. The printing apparatus according to claim 1, wherein the image data received by the receiver is based on image data of a plurality of originals and the controller is further configured to control the printer engine to print at least one image based on the image data received by the receiver on each of a plurality of sheets arranged in a page order of the booklet, each of the plurality of sheets being included in the booklet.

6. A non-transitory computer-readable storage medium storing a program for causing a computer to implement a method for controlling a printing apparatus including a printer engine for printing an image on a sheet based on image data, the method comprising:
   receiving image data;
   performing saddle stitching on a sheet conveyed from the printer engine and discharging a booklet including the sheet;
   in a case that an opening orientation of the saddle stitching is designated to be left-open and a print on an outer surface of a front cover of the booklet is designated and in a case that an opening orientation of the saddle stitching is designated to be right-open and a print on an outer surface of a back cover of the booklet is designated, controlling the printer engine to print the image on the sheet without rotating the data image 180 degrees; and
   in a case that an opening orientation of the saddle stitching is designated to be right-open and the print on the outer surface of the back cover of the booklet is not designated, controlling the printer engine to print the image on the sheet with rotating the image data 180 degrees,
   wherein the booklet is discharged from the saddle finisher with a printed surface of the booklet facing upward in both the case of the orientation of the saddle stitching being left-open and the case of the orientation of the saddle stitching being right-open.

* * * * *